United States Patent
Togawa

(10) Patent No.: US 7,818,751 B2
(45) Date of Patent: Oct. 19, 2010

(54) METHODS AND SYSTEMS FOR SCHEDULING EXECUTION OF INTERRUPT REQUESTS

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1270 days.

(21) Appl. No.: 10/523,094

(22) PCT Filed: May 11, 2004

(86) PCT No.: PCT/JP2004/006608

§ 371 (c)(1),
(2), (4) Date: Feb. 1, 2005

(87) PCT Pub. No.: WO2004/109512

PCT Pub. Date: Dec. 16, 2004

(65) Prior Publication Data

US 2005/0278719 A1    Dec. 15, 2005

(30) Foreign Application Priority Data

Jun. 3, 2003    (JP)    ............................. 2003-157565

(51) Int. Cl.
G06F 9/46    (2006.01)
G06F 9/455    (2006.01)
G06F 13/24    (2006.01)

(52) U.S. Cl. ........................... 718/108; 718/1; 718/100; 718/102; 718/104; 710/260; 710/263; 710/264; 710/267

(58) Field of Classification Search ................. 718/102, 718/104–105, 107–108
See application file for complete search history.

(56) References Cited

U.S. PATENT DOCUMENTS 4,912,628 A    3/1990    Briggs (Continued)

FOREIGN PATENT DOCUMENTS

EP    1 059 582    12/2000

(Continued)

OTHER PUBLICATIONS

Hamidzadeh B. et al., "To Schedule or To Execute: Decision Support and Performance Implications", Real Time Systems, vol. 16, No. 2/3, May 1999, pp. 281-313.

(Continued)

*Primary Examiner*—Meng-Ai An
*Assistant Examiner*—Abdullah Al Kawsar
(74) *Attorney, Agent, or Firm*—Finnegan, Henderson, Farabow, Garrett & Dunner, L.L.P.

(57) ABSTRACT

In process control based on partition setting which is a process corresponding to a plurality of operating systems (OSs), a configuration is implemented in which an interrupt request can be processed efficiently. In process control for switching processes which are based on the plurality of OSs, it is configured to set an interrupt processing partition as an interrupt processing execution period corresponding to an interrupt processing request so as to coincide with a pre-set partition switching timing. Further, a processing schedule is set, taking a maximum allowable delay time, a minimum allowable delay time into account. As a result of the present configuration, an increment in the number of partition switching processes can be kept to 1, and thus efficient data processing becomes possible.

15 Claims, 17 Drawing Sheets

U.S. PATENT DOCUMENTS

| | | | |
|---|---|---|---|
| 5,752,030 A * | 5/1998 | Konno et al. | 718/102 |
| 5,812,844 A | 9/1998 | Jones et al. | |
| 6,105,051 A * | 8/2000 | Borkenhagen et al. | 718/103 |
| 6,615,303 B1 * | 9/2003 | Endo et al. | 710/260 |
| 6,711,605 B2 * | 3/2004 | Sekiguchi et al. | 718/100 |
| 6,715,016 B1 * | 3/2004 | Ohno et al. | 710/260 |
| 6,757,897 B1 * | 6/2004 | Shi et al. | 718/102 |
| 6,772,419 B1 * | 8/2004 | Sekiguchi et al. | 719/319 |
| 6,944,736 B2 * | 9/2005 | Wilson et al. | 711/167 |
| 7,302,511 B2 * | 11/2007 | Jeyasingh et al. | 710/260 |
| 7,434,224 B2 * | 10/2008 | Lescouet et al. | 718/108 |
| 2001/0054055 A1 | 12/2001 | Bollella | |
| 2002/0019843 A1 | 2/2002 | Killian et al. | |
| 2002/0026538 A1 * | 2/2002 | Takeo et al. | 710/5 |
| 2002/0120884 A1 * | 8/2002 | Nakamikawa et al. | 714/31 |
| 2002/0161961 A1 * | 10/2002 | Hardin et al. | 711/6 |
| 2003/0037089 A1 * | 2/2003 | Cota-Robles et al. | 709/1 |

FOREIGN PATENT DOCUMENTS

| | | |
|---|---|---|
| EP | 1 162 536 | 12/2001 |
| EP | 1162536 A1 * | 12/2001 |
| JP | 1-241631 | 9/1989 |
| JP | 01-241631 | 9/1989 |
| JP | 6-250850 | 9/1994 |
| JP | 06-250850 | 9/1994 |
| JP | 2001-282558 | 10/2001 |
| JP | 2003-36176 | 2/2003 |
| JP | 2003-036176 | 2/2003 |

OTHER PUBLICATIONS

Aron, M. Soft Timers: Efficient Microsecond Software Timer Support for Network Processing. ACM Transactions on Computer Systems, Aug. 2000, vol. 18, No. 3, pp. 197-228.

* cited by examiner

FIG. 2
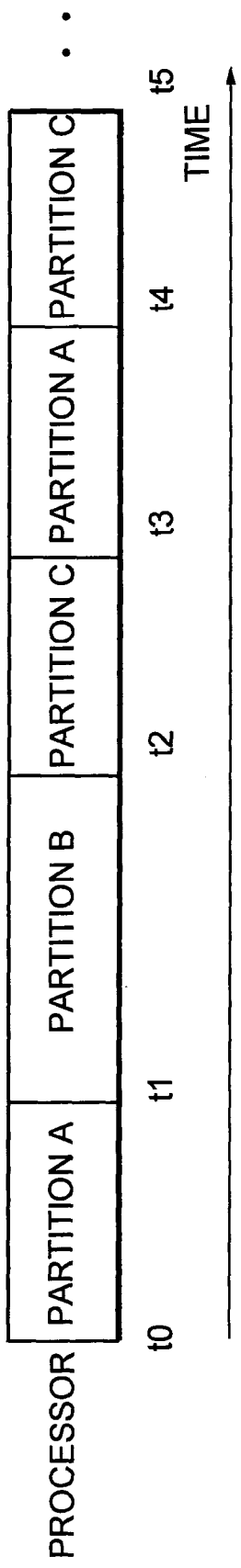
(a) EXAMPLE PARTITION SCHEDULING IN SINGLE-PROCESSOR SYSTEM
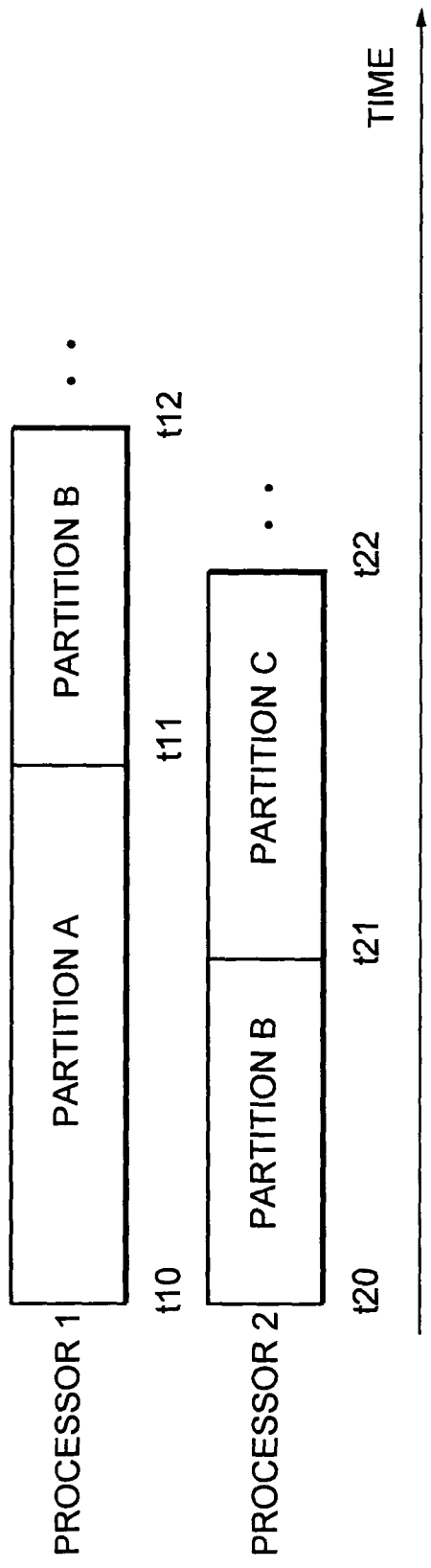
(b) EXAMPLE PARTITION SCHEDULING IN MULTI-PROCESSOR SYSTEM

FIG. 10

| INTERRUPT ORIGINATING SOURCE | INTERRUPT GROUP NUMBER | INTERRUPT PROCESSING PARTITION ID | MAXIMUM ALLOWABLE DELAY TIME | MINIMUM ALLOWABLE DELAY TIME |
|---|---|---|---|---|
| NETWORK INTERFACE | 1 | 00031abc77 | 00:00:02.44'21" | 00:00:00.12'21" |
| .. | .. | .. | .. | .. |

FIG. 11

| INTERRUPT GROUP NUMBER | INTERRUPT ORIGINATING SOURCES |
|---|---|
| 1 | INTERRUPT ORIGINATING SOURCES a,b,c |
| 2 | INTERRUPT ORIGINATING SOURCES d,e,f |
| 3 | INTERRUPT ORIGINATING SOURCES g,h,i |
| ⋮ | ⋮ |

FIG. 12

| INTERRUPT REQUEST ID | MAXIMUM ALLOWABLE DELAY TIME | MINIMUM ALLOWABLE DELAY TIME |
|---|---|---|
| 023ab...d75 | 00:00:02.44'21" | 00:00:00.12'21" |
| ⋮ | ⋮ | ⋮ |
| 131cd...e32 | 00:01:21.23'22" | 00:00:00.23'31" |

FIG. 13

| CURRENT PARTITION ID | INTERRUPT GROUP | PARTITION CONTEXT |
|---|---|---|
| 00021abc77 | 1, 3 | REGISTER SETTING VALUES NOTIFIED INTERRUPT SET PREDICTED START TIME |
| 001232bc21 | 2 | |
| : | : | : |
| 01432ead11 | 1 | |

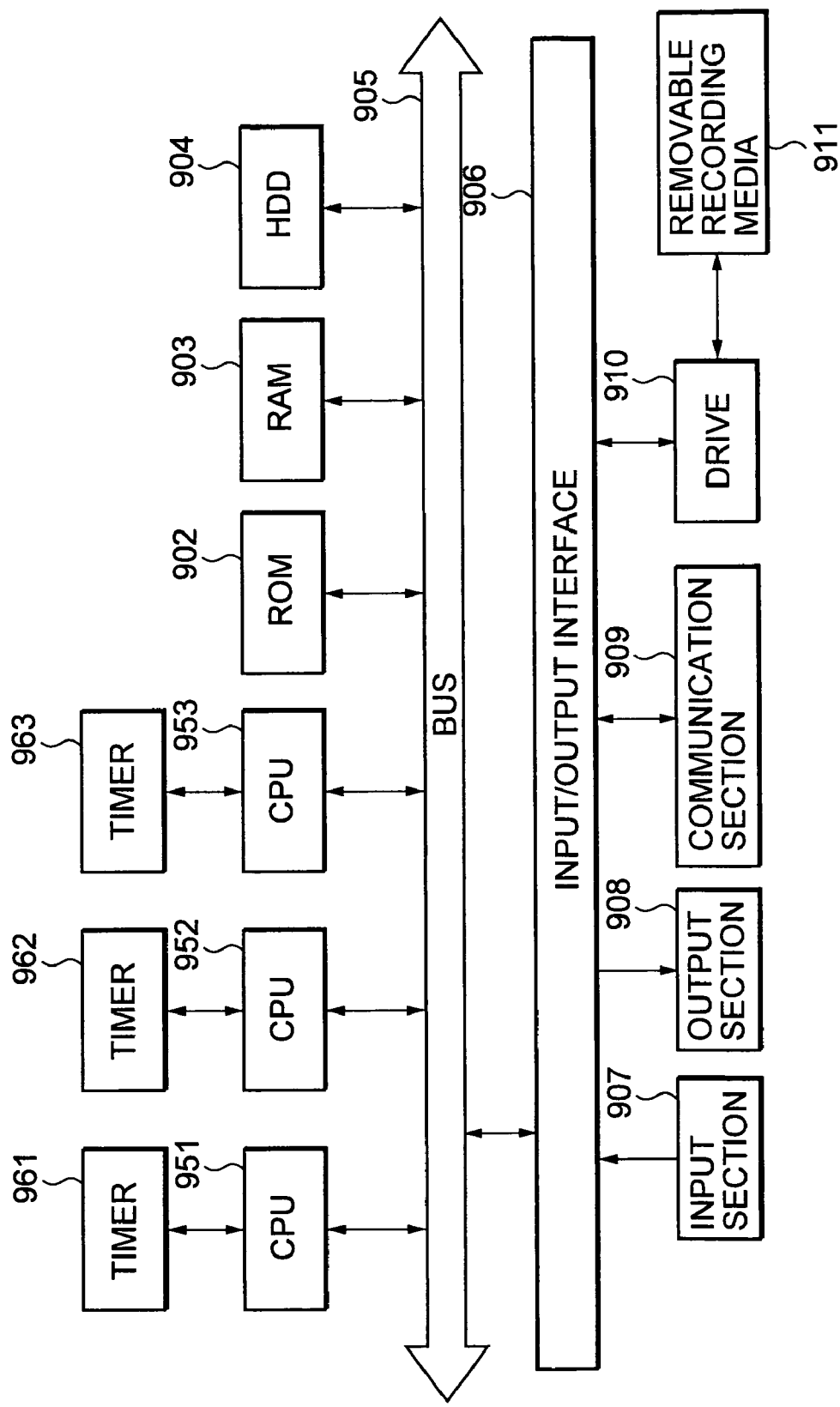

METHODS AND SYSTEMS FOR SCHEDULING EXECUTION OF INTERRUPT REQUESTS

TECHNICAL FIELD

The present invention relates to an information processing apparatus, a process control method, and a computer program. More particularly, the invention relates to an information processing apparatus, a process control method, and a computer program that implement optimal data processing by management of timings at which to execute interrupt request processing.

BACKGROUND ART

Generally, computer systems have a mechanism in which when an event involving intervention of software occurs at peripheral hardware, the peripheral hardware sends an interrupt request to a processor to suspend execution of a program being executed at that moment and to start an interrupt processing program.

On the other hand, recent processors have their performance remarkably enhanced by adopting, e.g., the following mechanisms a-c.

a. Cache memories
 b. Many registers
 c. Branch prediction mechanisms

However, these mechanisms exhibit a relatively low performance to processing, such as interrupt processing, which would change control flow at unpredictable timing.

On the other hand, in high-speed communication mechanisms in which interrupts could occur, e.g., every 12 μsec, such as so-called gigabit Ethernet (registered trademark), interrupt requests occur highly frequently. For example, in a case of receiving 1500-bytes packets at a communication rate of 1 Gbps, each packet is received every 12 microseconds. In a case where an ordinary hardware configuration is adopted in which an interrupt is originated every time a packet is received, interrupt processing must be performed every 12 microseconds.

Further, even in a system, such as a set-top box, in which many interrupt request originating sources must be stored internally, a ratio of a time consumed for interrupt processing to a total processing time tends to increase.

If interrupt request occurring intervals are predictable, this problem can be overcome by polling of a timer device by an operating system. This configuration is disclosed in, e.g., Non-Patent Document 1 (Mohit Aron and Peter Druschel, Soft Timers: Efficient Microsecond Software Timer Support for Network Processing, ACM Transactions on Computer Systems, Vol. 18, No. 3, August 2000).

However, such a technique is not applicable to interrupt request originating sources in which interrupt request occurring intervals are not predictable. The problem that the overhead increases with increasing interrupt occurring frequency would not only lead to a problem involving individual operating systems (OSs), but also impose a serious problem on partition management software that executes OS scheduling for concurrently operating a plurality of OSs in a single system.

In a case where a plurality of OSs are installed in a single system, processes executed by the OSs utilize hardware common to the system, i.e., a CPU, a memory, and the like, and thus it is required to execute the processes by the OSs while switching them time-sequentially. Partition management software executes such OS scheduling. Partitioning is a process corresponding to each of the OSs.

For example, assuming that two OS ($\alpha$) and OS ($\beta$) reside together in a single system, and that a process of the OS ($\alpha$) is designated a partition A and a process of the OS ($\beta$) is designated a partition B, then the partition management software determines an execution schedule for the partitions A and B, and executes the processes of the OSs on the basis of the determined schedule.

Thus, in an environment in which a plurality of OSs operate in a single system, in a case where an interrupt process can be executed only by the OS ($\alpha$) operating in a particular partition, and in a case where a partition operating at the time of an interrupt request is the partition (B) of the OS ($\beta$) that cannot accommodate the interrupt process, a process is performed, in which the processing of the partition (B) is suspended; the interrupt process is executed by applying the OS ($\alpha$); and the processing of the partition (B) is resumed after the interrupt process is completed. Thus, in processing interrupt requests, partition switching is to take place frequently.

Further, as a conventional partition management scheme, there is a configuration in which execution timings of partitions corresponding to OSs under management are determined irrespective of the occurrence of interrupts. In such a scheme, in a case where an interrupt request occurs, a partition corresponding to the interrupt request is to be set, without changing the already scheduled partitions corresponding to the OSs under management. In a case where an already scheduled partition dwells for a long time period, an interrupt request process may have to wait for a long time until its execution is started.

Thus, in the conventional partition management scheme that gives priority to the processes (partitions) of OSs under management, and thus keeps an interrupt request process waiting until there is an empty time slot between the processes (partitions) of the OSs under management, in a case where there is an interrupt request originating source demanding a stringent response time, an interrupt request process cannot be executed properly, making it likely to cause data processing error such as communication error.

DISCLOSURE OF THE INVENTION

The present invention has been made in view of the above-mentioned problems addressed in the related art, and thus has an object to provide an information processing apparatus, a process control method, and a computer program which, in a system in which a plurality of OSs are installed and processing of each of the OSs is executed by partition management, execute interrupt requests after determining their optimal processing timings, whereby to prevent the interrupt request processing overhead from increasing to implement efficient processing of the system as a whole, and to prevent occurrence of processing error due to waiting times exceeding allowable times of an interrupt request, or the like.

A first aspect of the present invention is an information processing apparatus characterized by having:

a storage section storing a plurality of operating systems (OSs), a processor that executes processes which are based on the above-mentioned plurality of OSs, and process management means that schedules a partition defined as a process of each of the above-mentioned plurality of OSs along a time axis, and executes control for switching the above-mentioned plurality of OSs on the basis of partition switching control along the scheduling, wherein the above-mentioned process management means is configured to perform process control in which an interrupt processing partition as an interrupt processing period corresponding to an interrupt processing request is set so as to coincide with a pre-set partition switching timing, and to cause any of the above-mentioned OSs to execute an interrupt process as a process subsequent to an end of a scheduled partition in a partition schedule.

Furthermore, in an embodiment of the information processing apparatus of the present invention, the above-mentioned process management means is characterized by being configured to execute a process of setting the above-mentioned interrupt processing partition so as to coincide with an earliest partition switching timing that occurs after occurrence of the interrupt request.

Furthermore, in an embodiment of the information processing apparatus of the present invention, the above-mentioned process management means is characterized by being configured to perform process control in which a partition being executed is suspended to execute the interrupt process, in a case where a maximum allowable delay time is set to the interrupt processing request and the pre-set partition switching timing does not occur within the maximum allowable delay time from the occurrence of the interrupt request.

Furthermore, in an embodiment of the information processing apparatus of the present invention, the processor that executes the processes which are based on the above-mentioned plurality of OSs is characterized by being configured to have a plurality of processors capable of operating in parallel, and the above-mentioned process management means is characterized by being configured to schedule the above-mentioned partition along the time axis as to each of the above-mentioned plurality of processors to execute partition switching control along a partition schedule as to each of the processors, and to execute a process of selecting one of a plurality of partition schedules corresponding to the above-mentioned plurality of processors, and setting the above-mentioned interrupt processing partition so as to coincide with a partition switching timing in the selected partition schedule.

Furthermore, in an embodiment of the information processing apparatus of the present invention, the above-mentioned process management means is characterized by being configured to execute a process of selecting one of the plurality of partition schedules in which an earliest partition switching timing occurs after the occurrence of the interrupt request, and setting the above-mentioned interrupt processing partition so as to coincide with the earliest partition switching timing.

Furthermore, in an embodiment of the information processing apparatus of the present invention, the above-mentioned process management means is characterized by being configured to execute, in a case where the interrupt request is a request in which a minimum allowable delay time is set, a process of setting the above-mentioned interrupt processing partition so as to coincide with a pre-set partition switching timing that occurs after the minimum allowable delay time passes from the occurrence of the interrupt request.

Furthermore, in an embodiment of the information processing apparatus of the present invention, the above-mentioned process management means is characterized by being configured to perform, in a case where an interrupt process corresponding to an interrupt processing request is executable in a scheduled partition defined by a pre-set partition schedule, a process of executing the interrupt process in the above-mentioned scheduled partition.

Furthermore, in an embodiment of the information processing apparatus of the present invention, the processor that executes the processes which are based on the above-mentioned plurality of OSs is characterized by being configured to have a plurality of processors capable of operating in parallel, and the above-mentioned process management means is characterized as being configured to have a processor-corresponding partition switching module arranged to execute process control corresponding to each of the processors.

Furthermore, in an embodiment of the information processing apparatus of the present invention, the above-mentioned partition switching module is characterized by being configured to have interrupt group information as interrupt request originating source information which can be accommodated by a processor to which the partition switching module is made to correspond, and to execute a process related to an interrupt request entry stored in a reservation queue corresponding to a group which can be accommodated by a processor to be identified by the above-mentioned interrupt group information, from a plurality of interrupt group-corresponding reservation queues, one being provided for each interrupt group.

Furthermore, a second aspect of the present invention is a process control method for controlling switching of processes which are based on a plurality of operating systems (OSs), which includes:

a step of detecting occurrence of an interrupt processing request, an interrupt processing partition setting step of setting an interrupt processing partition as an interrupt processing execution period corresponding to the above-mentioned interrupt processing request so as to coincide with a pre-set partition switching timing, and an interrupt processing execution step of causing any of the above-mentioned OSs to execute an interrupt process as a process subsequent to an end of a partition scheduled in a partition schedule according to the above-mentioned interrupt processing partition setting information.

Furthermore, in an embodiment of the process control method of the present invention, the above-mentioned interrupt processing partition setting step is characterized by executing a process of setting the above-mentioned interrupt processing partition so as to coincide with an earliest partition switching timing that occurs after the occurrence of the interrupt request.

Furthermore, in an embodiment of the process control method of the present invention, the above-mentioned interrupt processing partition setting step is characterized by suspending a partition being executed and setting the interrupt processing partition at a suspended point, in a case where a maximum allowable delay time is set to the interrupt processing request and the pre-set partition switching timing does not occur within the maximum allowable delay time from the occurrence of the interrupt request.

Furthermore, in an embodiment of the process control method of the present invention, the above-mentioned process control method includes a step of scheduling the above-mentioned partition along a time axis as to each of the plurality of processors that execute processes which are based on the above-mentioned plurality of OSs, to execute partition switching control along a partition schedule as to each of the processors, and the above-mentioned interrupt processing partition setting step is characterized by selecting one of a plurality of partition schedules corresponding to the above-mentioned plurality of processors, and setting the interrupt processing partition so as to coincide with a partition switching timing in the selected partition schedule.

Furthermore, in an embodiment of the process control method of the present invention, the above-mentioned interrupt processing partition setting step is characterized by executing a process of selecting one of the plurality of partition schedules in which an earliest partition switching timing occurs after the occurrence of the interrupt request, and setting the above-mentioned interrupt processing partition so as to coincide with the earliest partition switching timing.

Furthermore, in an embodiment of the process control method of the present invention, the above-mentioned interrupt processing partition setting step is characterized by executing, in a case where the interrupt processing request is a request in which a minimum allowable delay time is set, a process of setting the above-mentioned interrupt processing partition so as to coincide with a pre-set partition switching timing that occurs after the minimum allowable delay time passes from the occurrence of the interrupt processing request.

Furthermore, in an embodiment of the process control method of the present invention, the process control method is characterized by performing a process of executing, in a case where an interrupt process corresponding to an interrupt processing request is executable in a scheduled partition defined by a pre-set partition schedule, an interrupt process corresponding to the interrupt processing request in the above-mentioned scheduled partition.

Furthermore, a third aspect of the present invention is a computer program that executes process control for controlling switching of processes which are based on a plurality of operating systems (OSs), which includes:

a step of detecting occurrence of an interrupt processing request, an interrupt processing partition setting step of setting an interrupt processing partition as an interrupt processing execution period corresponding to the above-mentioned interrupt processing request so as to coincide with a pre-set partition switching timing, and an interrupt processing execution step of causing any of the OSs to execute an interrupt process as a process subsequent to an end of a partition scheduled in a partition schedule according to the above-mentioned interrupt processing partition setting information.

According to the configuration of the present invention, in a process control for switching processes which are based on a plurality of operating systems (OSs), it is configured to set an interrupt processing partition as an interrupt processing execution period corresponding to an interrupt processing request so as to coincide with a pre-set partition switching timing. Therefore, an increment in the number of partition switching processes corresponding to the interrupt request can be kept to 1, whereby processing load is prevented from increasing, and efficient data processing can be executed.

Furthermore, according to the configuration of the present invention, in a case where a maximum allowable delay time or a minimum allowable delay time is set to an interrupt processing request, it is configured to set an interrupt processing partition at a partition switching timing if the partition switching timing occurs within these allowable times, and to perform a forced interrupt process, e.g., in a case where the partition switching timing does not occur within these allowable times, whereby to execute processing accommodating various interrupt processing requests. Therefore, a configuration free from processing error is implemented.

Furthermore, according to the configuration of the present invention, in a configuration in which processes by a plurality of OSs are executable in parallel in a multi-processor system, it is configured to select one of a plurality of partition schedules corresponding to a plurality of processors, and set an interrupt processing partition so as to coincide with a partition switching timing in the selected partition schedule. Therefore, the interrupt request can be executed at the earliest partition switching timing after the occurrence of the interrupt processing request, from among the plurality of partition schedules, and thus more efficient data processing becomes possible.

Note that the computer program of the present invention is a computer program that can be provided by a storage medium, a communication medium, e.g., a storage medium such as a CD, a DVD, a MO, or a communication medium such as a network that is provided in a computer-readable form to, e.g., general-purpose computer systems that can execute various program codes. By providing such a program in a computer-readable form, processing according to the program can be implemented in the computer system.

Other objects, features, and advantages of the present invention will become more apparent by a more detailed description based on embodiments thereof to be described later and accompanying drawings. Note that in the present specification, the system means a configuration in which a plurality of apparatuses are logically grouped, and thus is not limited to a configuration in which apparatuses having specific configurations are arranged within a single housing.

BRIEF DESCRIPTION OF THE DRAWINGS

FIG. 2 is a diagram showing example scheduling based on partitions.

FIG. 10 is a diagram explaining a data configuration of interrupt request originating source information.

FIG. 11 is a diagram explaining an example of setting an interrupt group number.

FIG. 12 is a diagram explaining an example of storing a reservation queue.

FIG. 13 is a diagram explaining information referred to at the time of a partition switching process by a partition switching module.

FIG. 18 is a diagram showing a structural example of an information processing apparatus to which the present invention is applicable.

BEST MODES FOR IMPLEMENTING THE INVENTION

Figure 1:
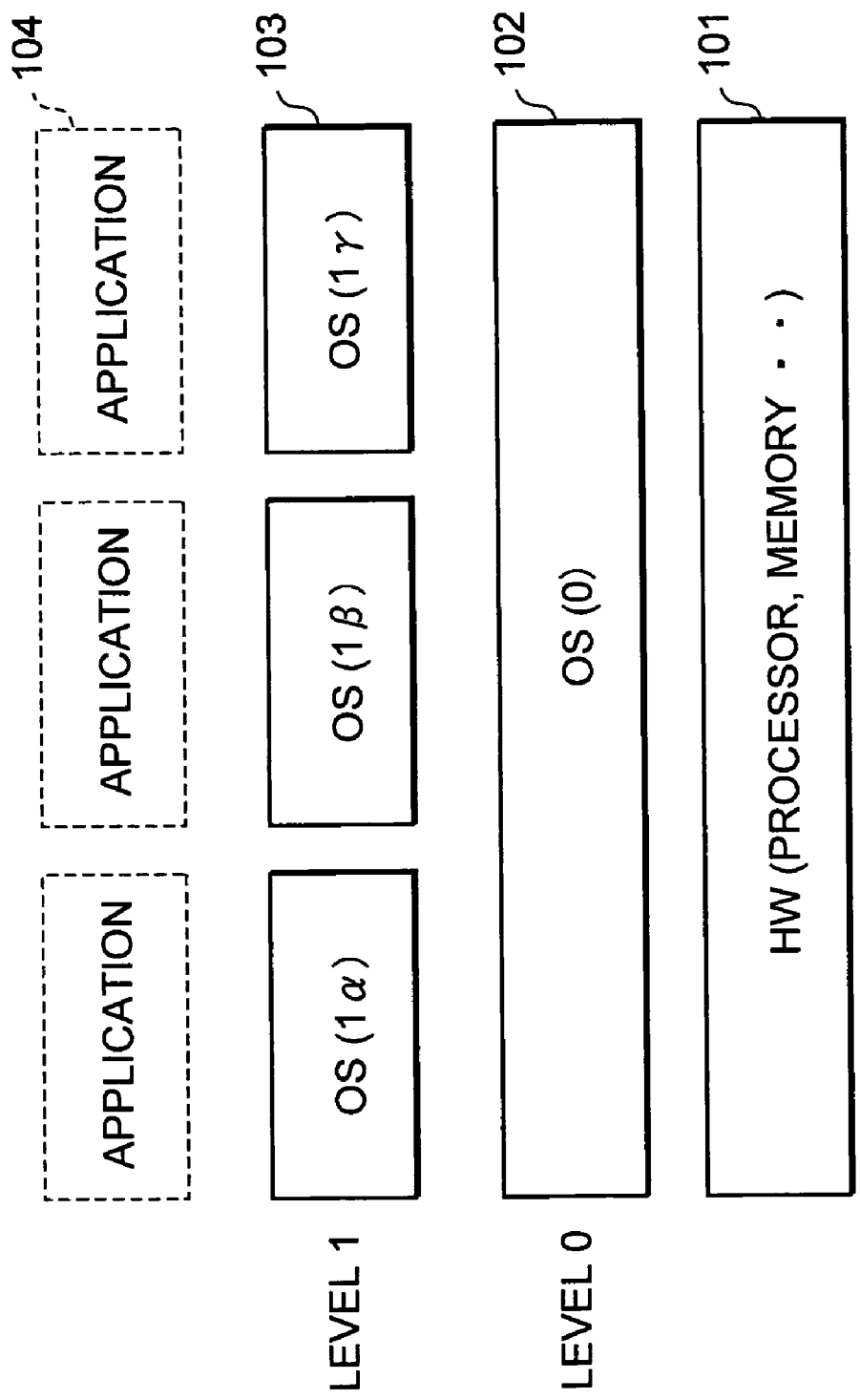
FIG. 1 is a diagram explaining a configuration of operating systems (OSs) applied to process control means, a process control method of the present invention.

Details of an information processing apparatus, a process control method, and a computer program of the present invention will hereinafter be described. Note that the description will be given in the order of the following sections.

1. Outline of process management according to the present invention
2. Process example 1 for interrupt request
3. Process example 2 for interrupt request
4. Process in multi-processor system
5. Interrupt request process to which minimum delay time is set
6. Interrupt request process using regular schedules
7. Configuration of process management means
8. Interrupt process setting and execution sequences
9. Example hardware configuration of information processing apparatus

[1. Outline of Process Management According to the Present Invention]

Referring first to FIG. 1, an outline of an information processing apparatus, a process control method of the present invention will be described. FIG. 1 is a diagram illustrating a configuration of operating systems (OSs) applied to an information processing apparatus, a process control method of the present invention.

The operating systems (OSs) applied to the information processing apparatus, the process control method of the present invention are configured, as shown in FIG. 1, such that a plurality of level 1-OSs (1α) (1β) (1γ) 103 are set on a level 0-OS (0) 102 that is arranged at a level 0. Applications 104 as various specific processing programs are set on the level 1-OSs 103 and operate so as to correspond to any of the level 1-OSs 103. Although there are shown three level 1-OSs 103 in FIG. 1, this is merely an example; the present invention is applicable to a so-called multi-OS system having an arbitrary number of OSs that is two or more. These OSs are stored in a storage section of the information processing apparatus and executed by a processor.

Note that in the following description, the OS (1), the OS (1α), the OS (1β) . . . mean level 1-OSs, and the OS (0) means a level 0-OS.

Hardware (HW) 101 is hardware such as a processor (CPU), a memory, commonly used among the OSs.

The level 0-OS (0) 102 executes scheduling related to processes executed by the three OSs (1), i.e., the OS (1α), the OS (1β), the OS (1γ) in the present example. The level 0-OS (0) 102 schedules the processes corresponding to the level 1-OSs (1) time-sequentially using divisions called partitions.

A scheduling example based on partitions is shown in FIG. 2. FIG. 2(a) is an example of partition scheduling in a configuration of a single-processor system having only one processor applicable to the processes of the level 1-OSs (1).

In the single-processor system having only one processor applicable to the processes of the level 1-OSs (1), the OS (1α), the OS (1β), the OS (1γ), which are level 1-OSs (1), cannot execute their processes in parallel, and thus their processes are scheduled into a single time-sequential process.

In the example shown in FIG. 2(a), the system executes a process by the OS (1α), i.e., a partition A, during a time t0-t1, a process by the OS (1β), i.e., a partition B, during a time t1-t2, and a process by the OS (1γ), i.e., a partition C, during a time t2-t3. From then on, the processes of the respective OSs are to be executed along the time axis.

FIG. 2(b) is an example of partition scheduling in a configuration of a multi-processor system having two processors applicable to the processes of the level 1-OSs.

In a case where there are a plurality of processors applicable to the processes of the level 1-OSs, the OS (1α), the OS (1β), the OS (1γ), which are level 1-OSs (1), can execute their processes in parallel according to the number of processors. Therefore, the level 0-OS (0) schedules the execution processes of the level 1-OSs as a plurality of time-sequential processes according to the number of processors.

In the example shown in FIG. 2(b), a processor 1 executes the process by the OS (1α), i.e., the partition A, during a time t10-t11, the process by the OS (β), i.e., the partition B, during a time t11-t12. On the other hand, a processor 2 executes the process by the OS (1β), i.e., the partition B, during a time t20-t21, and the process by the OS (1γ), i.e., the partition C, during a time t21-t22.

[2. Process Example 1 for Interrupt Request]

Next, partition management in a case of an interrupt request will be described. In a case where an interrupt request occurs, the level 0-OS (0) 102 executes a process of determining at which timing an interrupt process should be executed by which level 1-OS (1). That is, the level 0-OS (0) 102 as a process management means performs a process of setting an interrupt processing partition as an execution time for the interrupt process corresponding to the interrupt request.

In a case where the interrupt processing partition is set, the level 1-OS (1) performs the process according to the set partition schedule.

Figure 3:
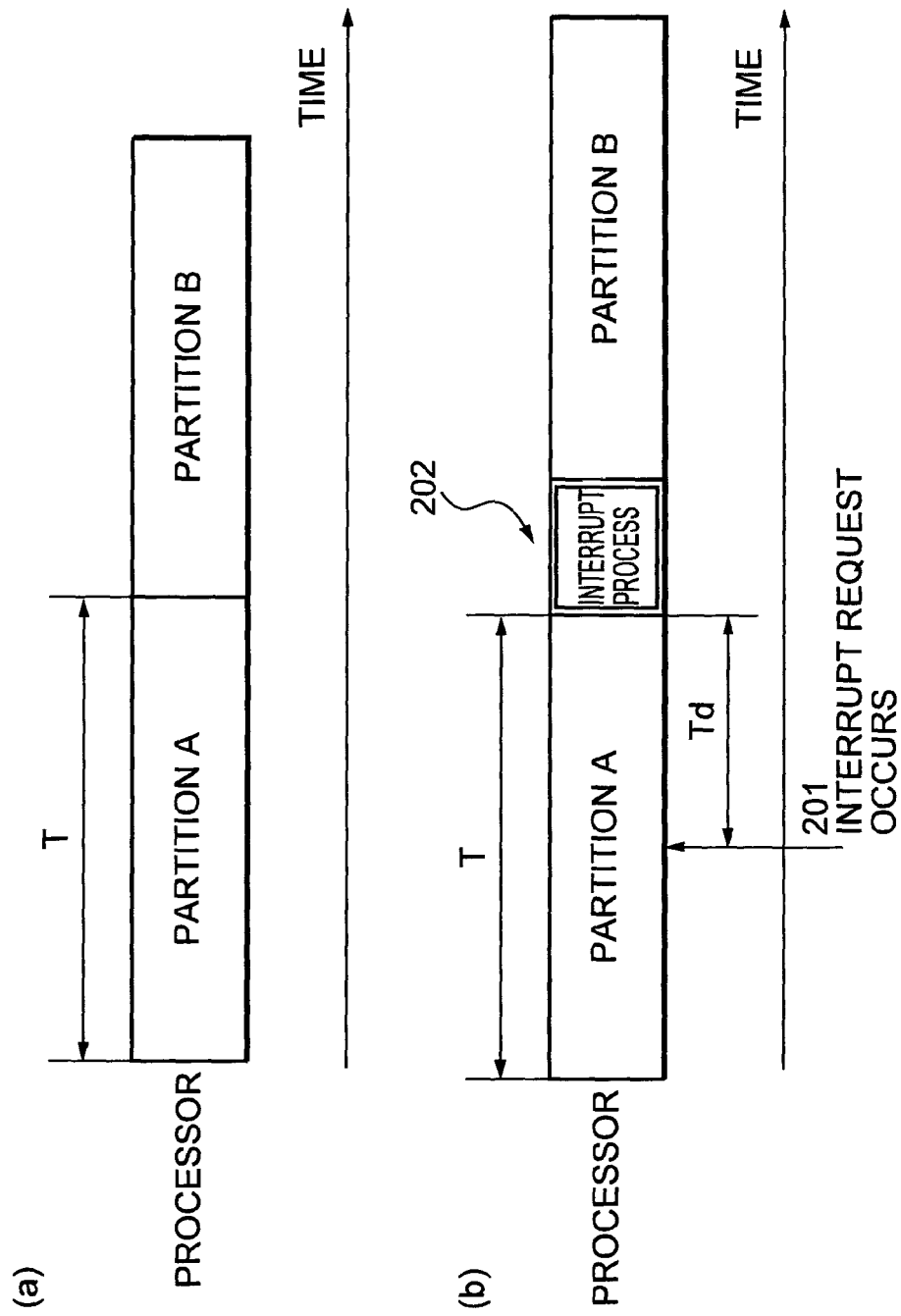
FIG. 3 is a diagram explaining example scheduling of an interrupt request in a single-processor system.

Referring to FIG. 3, a scheduling example of an interrupt request will be described, which is performed in a system in which the number of processors is one or processors are independent of each other in terms of interrupt processing, i.e., a single-processor system.

The example interrupt request scheduling shown in FIG. 3 is an example in which, in a case where the interrupt request cannot be processed by the OS (1α) that is executing a partition at the time of the interrupt request, the level 0-OS (0) sets an interrupt partition to an OS (1x) (x≠α) capable of processing the interrupt request after the partition being executed is terminated, while keeping the interrupt request waiting until the partition being executed is terminated. FIG. 3(a) shows scheduling at the time no interrupt has occurred yet.

In FIG. 3(b), the interrupt request occurs during execution of the partition A that is a process by the OS (1α), and in a case where the interrupt request cannot be executed by the OS (1α) but can be executed by another OS (1x) (x≠α), execution of an interrupt request process is kept from being executed until a scheduled partition switching time occurs. After the interrupt request process is completed, the process by the partition B is executed.

As shown in FIG. 3(b), although an interrupt request 201 occurs during execution of the partition A, which is a process by the OS (1α), the level-0 (OS) retards the start of processing the interrupt request 201 until execution of the partition A is terminated.

That is, the level 0-OS keeps the interrupt request 201 waiting until the end time of the partition A that occurs after a time Td passes from the occurrence of the interrupt request, and sets an interrupt processing partition that is a process corresponding to the interrupt request. This delay time Td is a time until a timing at which switching occurs from the partition A to another partition in a partition schedule made when the interrupt has not occurred yet. In the present embodiment, the interrupt processing partition is set so as to coincide with the earliest partition switching timing that occurs after the occurrence of the interrupt request.

The above-mentioned scheduling process for an interrupt request provides an advantage of reducing the number of partition switches, compared with the conventional scheme.

Figure 4:
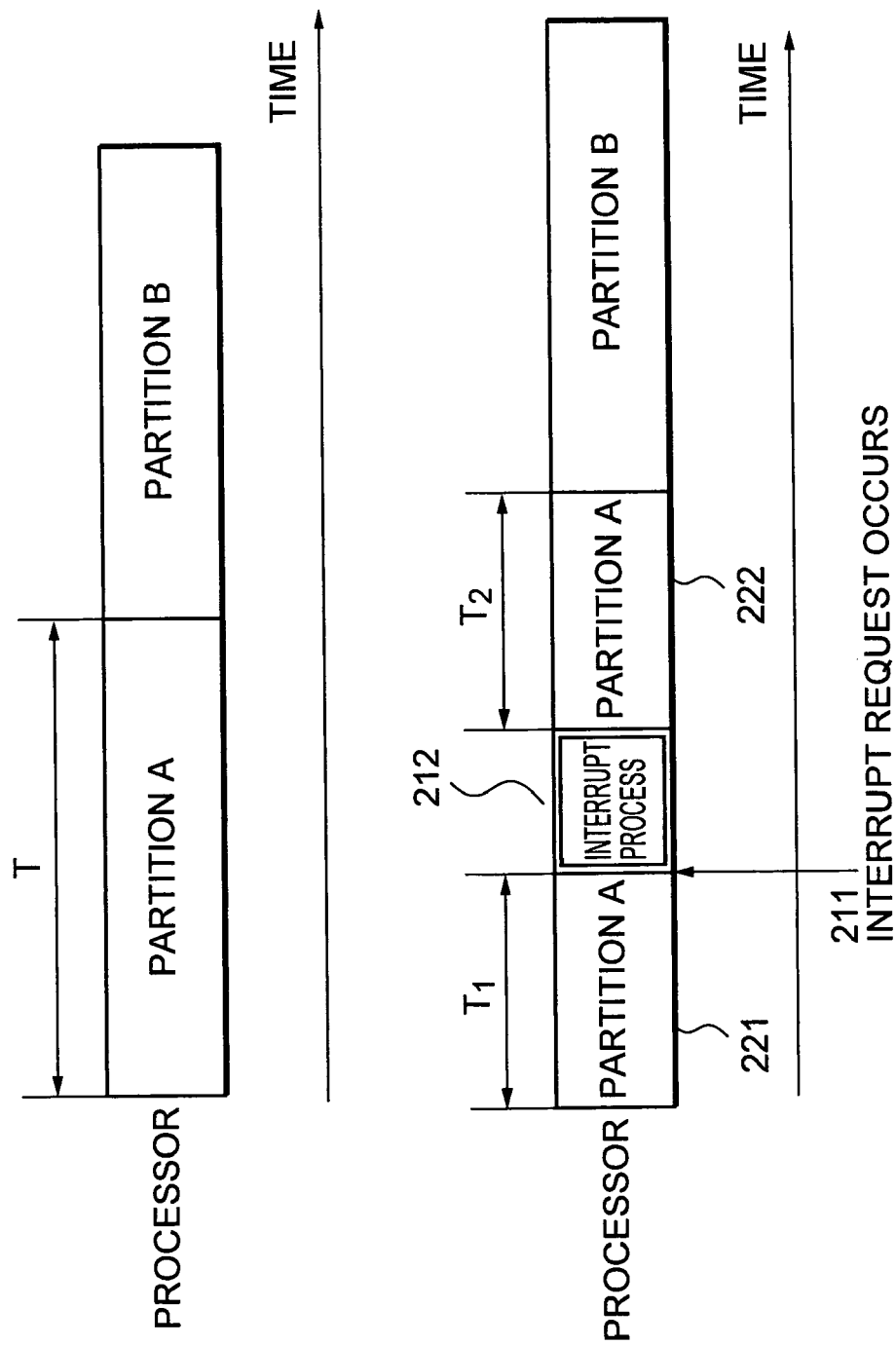
FIG. 4 is a diagram explaining an example conventional interrupt request process in which an interrupt processing partition is instantly started upon occurrence of an interrupt request.

A conventional interrupt request process example is shown in FIG. 4, in which an interrupt processing partition is instantly started upon occurrence of an interrupt request.

The process example shown in FIG. 4 is an example in which an interrupt request occurs at a similar timing to that shown in FIG. 3. FIG. 4(a) shows scheduling at the time no interrupt has occurred yet.

In FIG. 4(b), in a case where an interrupt request 211 occurs during the execution period of the partition A, which is a process by the OS (1α), and this interrupt request cannot be executed by the OS (1α) but can be executed by another OS (1x) (x≠α), an interrupt processing partition 212 is instantly started upon occurrence of the interrupt request.

As shown in FIG. 4(b), the interrupt request 211 occurs during the execution period of the partition A, which is a process by the OS (1α), and the interrupt processing partition 212 is set immediately thereafter.

At this timing, the partition A is suspended, and two partitions A221, A222 are to be executed before and after the interrupt processing partition 212. As a result, switching from the partition A221 to the interrupt processing partition 212, and switching from the interrupt processing partition 212 to the partition A222 are required, increasing the number of partition switching involved for executing the interrupt process to 2.

In the example shown in FIG. 3, the interrupt processing partition is executed only after the partition A is terminated, and thus an increment in the number of partition switching involved for executing the interrupt process is only 1. Thus, by retarding the interrupt process in this way, an advantage is provided that the increment in the number of partition switches can be reduced to 1.

Another advantage is to improve instruction execution efficiency. In FIG. 4, times set for the two split partitions A221, A222 are a T1, a T2, respectively, and T1+T2 equals the time T set when no interrupt has occurred yet. That is, T=T1+T2.

However, despite the fact that the length of the period T equals the sum of the lengths of the periods T1 and T2, the number of instructions executable during the period T becomes greater than the total of instructions executed during the periods T1 and T2. This happens because the execution of the partition A is not split by the execution of the interrupt processing partition. While the execution of the partition A is being suspended by the interrupt processing partition, states of various cache mechanisms and buffers (cache memories and TLB, branch prediction buffers) are updated by the interrupt processing partition. As a result of the updating, the instruction execution efficiency after the system having returned to the partition A is impaired, compared with the partition A being executed continuously.

As described with reference to FIG. 3, by setting an interrupt request processing partition to a timing that occurs after the scheduled end time of the partition being executed at the time of the interrupt request, advantages such as a reduction in the partition switching overhead and an improvement in the instruction execution efficiency are provided.

[3. Process Example 2 for Interrupt Request]

When the above-mentioned interrupt request process delaying technique is applied, in a case where a long execution time is set to a partition being executed at the time of an interrupt request, the start time of an interrupt request process would be retarded, and error would even be caused in some interrupt processes.

Figure 5:
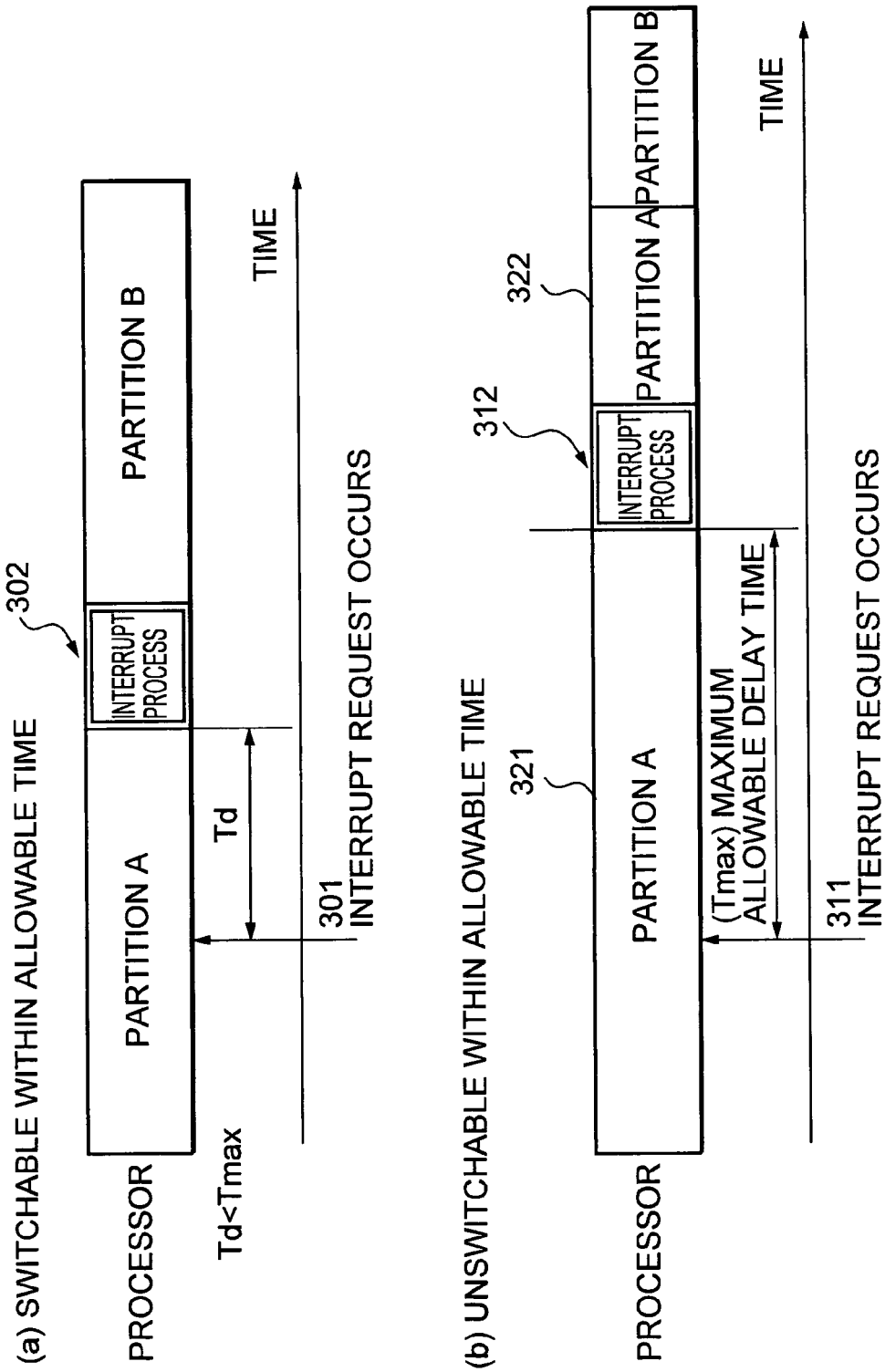
FIG. 5 is a diagram explaining a processing example in which a maximum delay time is limited.

As a process for overcoming this, an example in which a maximum delay time is limited will be described with reference to FIG. 5.

FIG. 5(a) shows an example process equivalent to the above-mentioned embodiment, in which the execution start position of an interrupt process is set at the end time of a partition (partition A) being executed at the time of an interrupt request 301. An interrupt processing partition 302 is set after the partition A is terminated.

The example shown in FIG. 5(a) is a process in which a time Td from the occurrence of the interrupt request 301 to a scheduled end time of the partition A is shorter than a maximum allowable delay time Tmax of the interrupt request, i.e., Td<Tmax, and thus it is a process that would cause no problem even if the execution of the interrupt request is delayed until the scheduled end time of the partition A.

Some interrupt requests have maximum allowable delay times set. The maximum allowable delay time is held by the level 0-OS (0) as, e.g., information set so as to correspond to an interrupt request originating source. These configurations will be described later.

In a case where an interrupt request to which a maximum allowable delay time is set occurs, and, as shown in FIG. 5(b), if a time to the scheduled end time of a partition being executed at the time of an interrupt request 311 is longer than the maximum allowable delay time Tmax of the interrupt request, the level 0-OS (0) suspends the partition A within the maximum allowable delay time Tmax of the interrupt request without waiting for the processing end of the partition, and sets and executes an interrupt processing partition 312.

This process is called a forced interrupt process. As a result of this forced interrupt process, the partition A is to be processed by division into a first-half partition A321 and a second-half partition A322.

Thus, in a case where partition switching does not take place even as the maximum allowable delay time of an interrupt request has passed, a partition being executed is suspended on or before the passage of the maximum allowable delay time, to be switched to an interrupt processing partition for execution.

Thus, in a system in which an interrupt request having a limited maximum response time (maximum allowable delay time) could occur, execution of an interrupt request process within the maximum response time (maximum allowable delay time) can be guaranteed by retarding the interrupt process while taking the allowable delay time into account, to prevent occurrence of data processing error due to excessive delay of the interrupt request.

[4. Process in Multi-processor System]

In the above-mentioned embodiments, their description has been premised on a system having only one processor or processors that are independent with each other in terms of interrupt processing. In a system in which a plurality of processors can perform processes in parallel, more efficient processing becomes possible.

Figure 6:
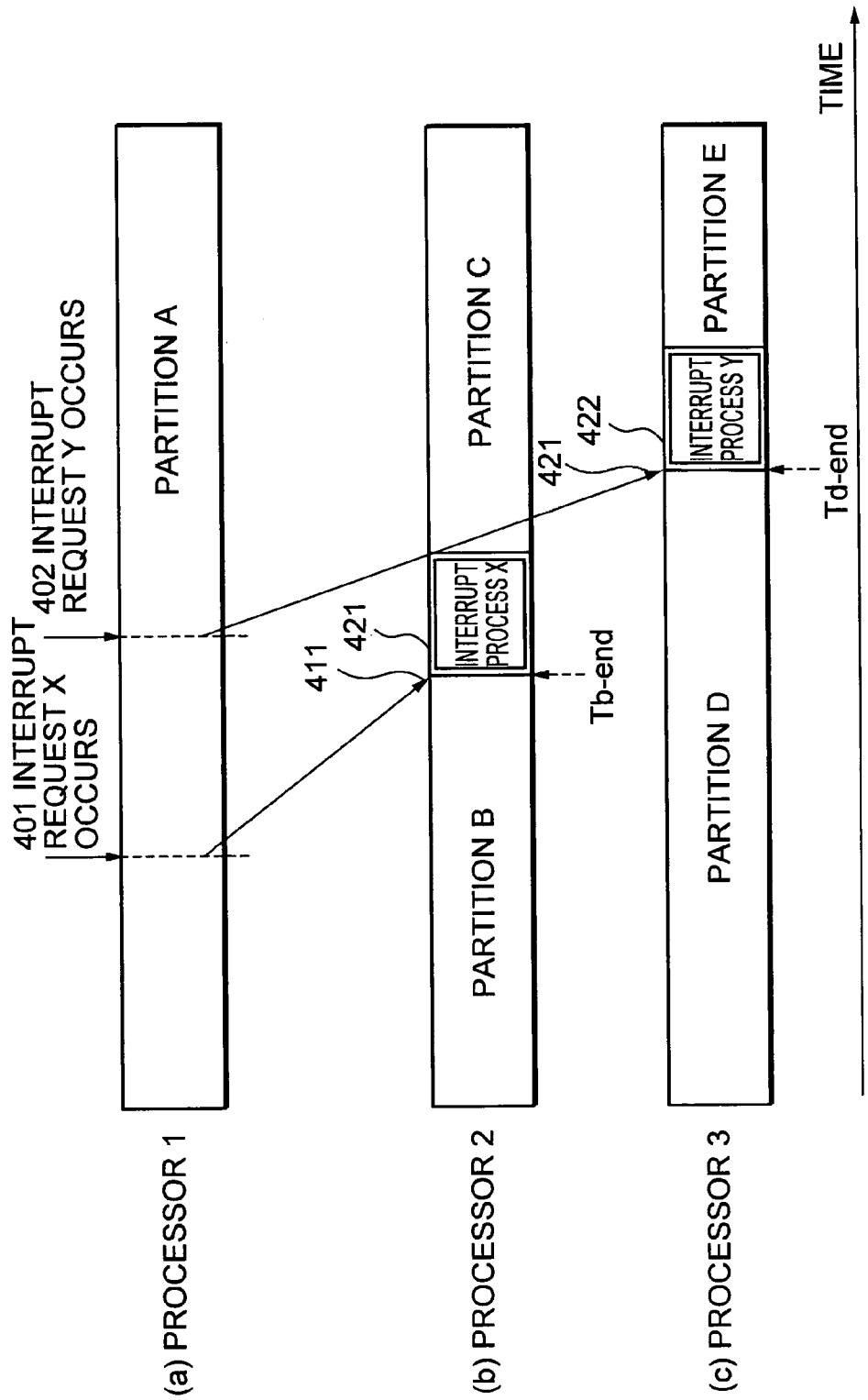
FIG. 6 is a diagram explaining example scheduling for interrupt requests in a multi-processor system.

A scheduling example for interrupt requests in a multi-processor system will be described with reference to FIG. 6. In FIG. 6, there are three processors capable of parallel processing (a processor 1, a processor 2, a processor 3), and the processing sequences for the processors 1, 2, 3 are scheduled by the level 0-OS (0), respectively.

FIG. 6(a) shows partition-based scheduling for a process to which the processor 1 is applied; and FIG. 6 (b) shows partition-based scheduling for a process to which the processor 2 is applied; and FIG. 6(c) shows partition-based scheduling for a process to which the processor 3 is applied.

In this example, an interrupt request X401 and an interrupt request Y402 occur at the processor 1. The processor 1 continues its execution of the partition A, while leaving interrupt processing partitions retarded. Thereafter, the processor 2 terminates its processing of the partition B, so a partition switching timing 411 occurs.

The partition configuration of each of the processors is supervised by the level 0-OS (0), and the level 0-OS (0) thus identifies a processor to which the earliest one of partition switching timings is set, which occurs after the interrupt request X401 or the interrupt request Y402 occurring at the processor 1.

At this time, the earliest partition switching timing to which an interrupt process X can be set is the partition switching timing 411 that coincides with the end of the processing of the partition B at the processor 2. The level 0-OS (0) transfers the interrupt process X being reserved at the processor 1 to the processor 2, and makes a schedule such that the interrupt process X is processed subsequent to the partition B, and thus sets an interrupt processing partition 412 so as to be processed after the processing of the partition B is terminated at the processor 2, to cause the interrupt process X to be executed by the processor 2.

Furthermore, the earliest partition switching timing to which an interrupt process Y can be set is a partition switching timing 421 that coincides with the end of the processing of a partition D at the processor 3. The level 0-OS (0) transfers the interrupt process Y being reserved at the processor 1 to the processor 3, and makes a schedule such that the interrupt process Y is processed subsequent to the partition D, and thus sets an interrupt processing partition 422 so as to be processed after the processing of the partition D is terminated at the processor 3, to cause the interrupt process Y to be executed by the processor 3.

Thus, in the multi-processor system capable of executing parallel processing by a plurality of processors, interrupt processes being delayed can be transferred between processors to cause an interrupt process being delayed to be executed by a processor to which the earliest partition switching timing that occurs after the occurrence of the interrupt request is set, and thus execution of an interrupt process with a shorter delay time becomes possible. Thus, execution of an interrupt process using a partition switching timing set by a predetermined partition schedule can be implemented at a high probability without suspending a partition being executed to handle a forced interrupt.

[5. Interrupt Request Process to Which Minimum Delay Time is Set]

As mentioned earlier, some interrupt requests have maximum allowable delay time set. Furthermore, other interrupt requests have minimum delay time set. A minimum delay time is set, e.g., for each interrupt request originating source, and is set as interrupt request originating source information, which is management information of the level 0-OS (0). These information items will be described later.

In a case where an interrupt request to which a minimum delay time is set occurs, its process would not be started until the minimum delay time passes, even if partition switching takes place.

Figure 7:
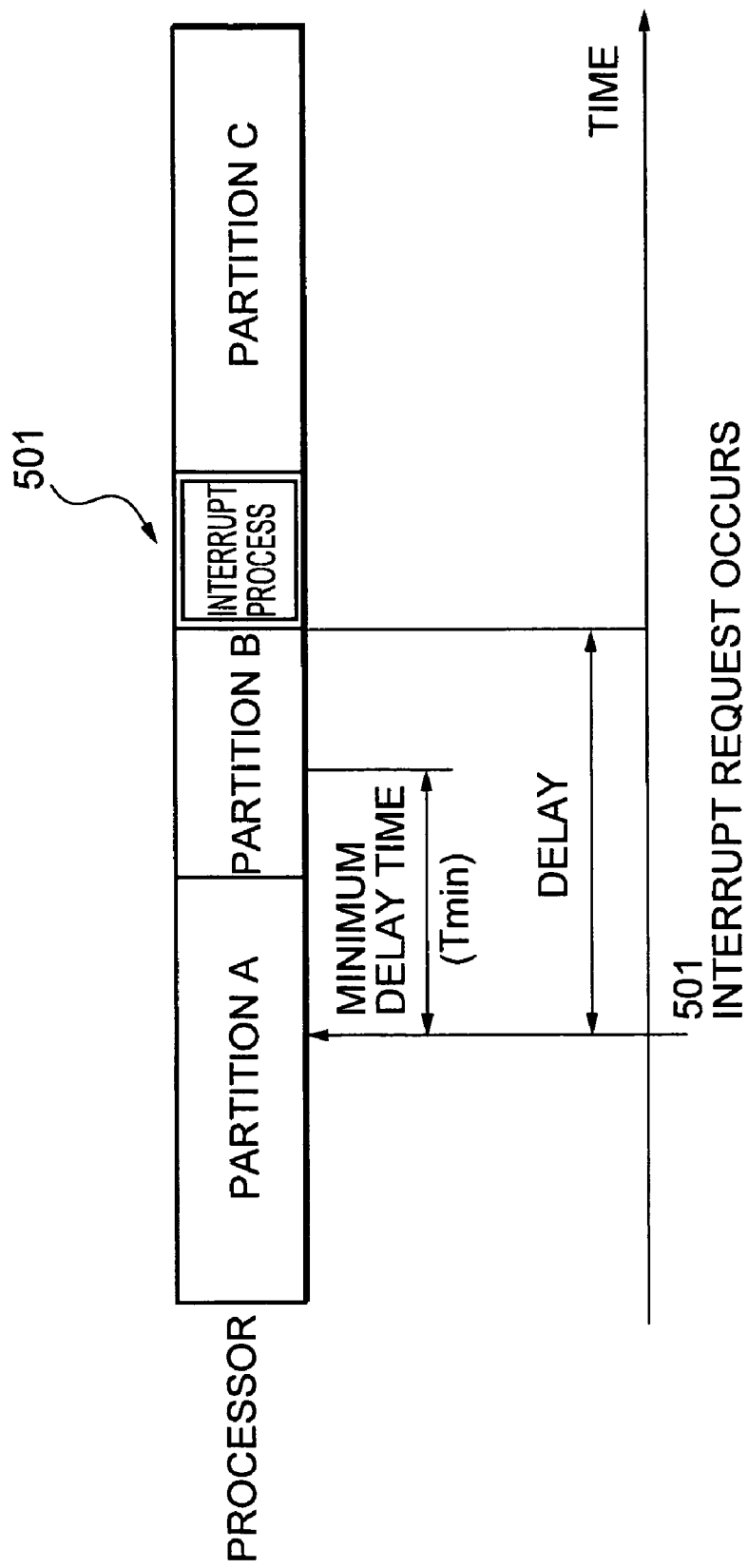
FIG. 7 is a diagram explaining a scheduling process for an interrupt request to which a minimum delay time is set.

Referring to FIG. 7, a scheduling process will be described, which is based on partition setting executed by the level 0-OS (0) for an interrupt request to which a minimum delay time is set.

In FIG. 7, an interrupt request 501 occurs during execution of the partition A. According to the earlier mentioned embodiments, an interrupt processing partition is to be set at the time of switching from the partition A to the partition B. However, the interrupt request 501 is an interrupt request to which a minimum delay time is set.

Thus, for the interrupt request to which a minimum delay time is set, the level 0-OS (0) keeps the interrupt request waiting until the minimum delay time passes from the occurrence of the interrupt request 501, and sets an interrupt processing partition 501 to a partition switching timing that occurs thereafter. The interrupt processing partition 501 is set after the partition B shown in FIG. 7 is terminated.

Note that in a case where an interrupt request to which a maximum delay time is additionally set, a process in which the maximum delay time is further taken into account. That is, if a timing for switching a partition occurs after the minimum delay time passes from the occurrence of the interrupt request and within the maximum delay time, an interrupt processing partition is set. However, in a case where a timing for switching a partition does not occur after the minimum delay time passes from the occurrence of the interrupt request and within the maximum delay time, the level 0-OS (0) suspends execution of that partition, and sets an interrupt processing partition therein.

[6. Interrupt Request Process Using Regular Schedules]

The schemes so far described are examples in which an interrupt process is basically postponed until a first timing for switching a partition occurs after occurrence of an interrupt, and in a case of no permission, the interrupt process is executed by suspending the partition.

However, some interrupt request originating source has a sufficiently longer allowable delay time than intervals at which partition switching occurs. On the other hand, it is rare for a partition performing an interrupt process to perform only the interrupt process, and thus such a partition is often allocated with a processor time similar to that allocated to other partitions. In such a case, in a regular scheduling process executed by the level 0-OS (0), it can be configured such that the level 0-OS (0) keeps a partition capable of performing an interrupt process from being scheduled, and executes the interrupt process in the scheduled partition. However, in this case also, it is conditional that the scheduling of the partition be retarded within a range not exceeding the allowable delay time of the interrupt request.

According to this configuration, setting of a partition solely for the execution of an interrupt request is no longer needed, and thus the interrupt processing overhead can be further reduced.

Figure 8:
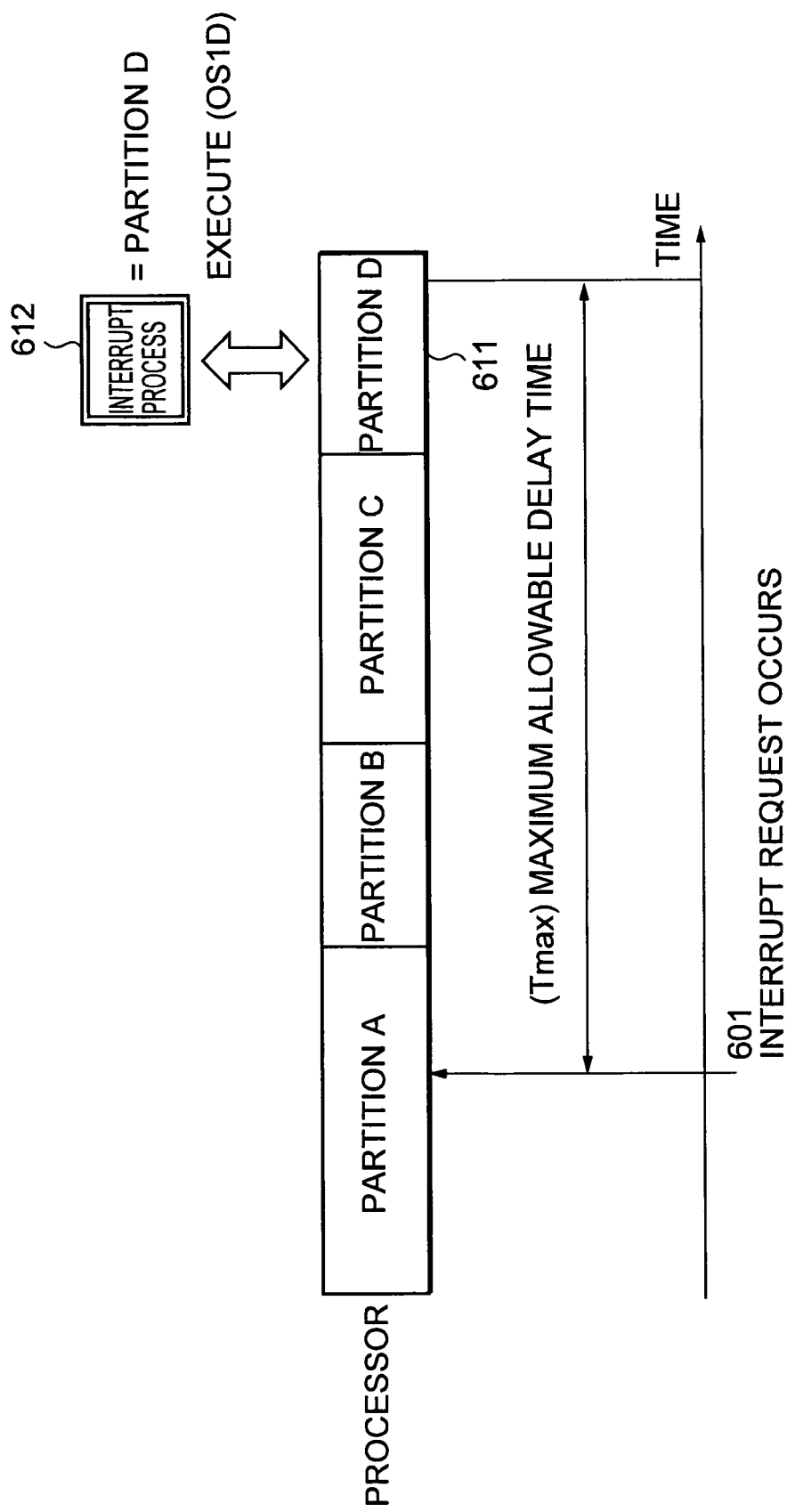
FIG. 8 is a diagram explaining a process of waiting for a partition capable of performing an interrupt process to be scheduled and executing an interrupt process in the scheduled partition.

The present configuration is a technique by which in a case where a partition schedule set by the level 0-OS (0) is predictable, an interrupt process is postponed using this predicted schedule. Referring to FIG. 8, an interrupt request process according to the present embodiment and its correspondence to a partition schedule will be described.

In FIG. 8, an interrupt request 601 occurs during execution of the partition A. A maximum allowable delay time (Tmax) is set to this interrupt request 601.

Let it be assumed that it could be predicted that a partition capable of processing the interrupt request 601 is scheduled within the maximum allowable delay time (Tmax), after the interrupt request 601 occurs. Then, this interrupt request 601 is set so as to be processed by that partition.

In FIG. 8, a partition D611 is a partition capable of processing the interrupt request 601, and also scheduled by a regular partition scheduling process by the level 0-OS (0). The interrupt request 601 is set so as to be executed in the partition D611.

According to this configuration, setting of a partition solely for the execution of an interrupt request is no longer needed, and thus the interrupt processing overhead can be reduced to implement efficient data processing.

[7. Configuration of Process Management Means]

Several process management process examples of the present invention have been described above. A configuration of process management means for executing these processes will be described below.

Figure 9:
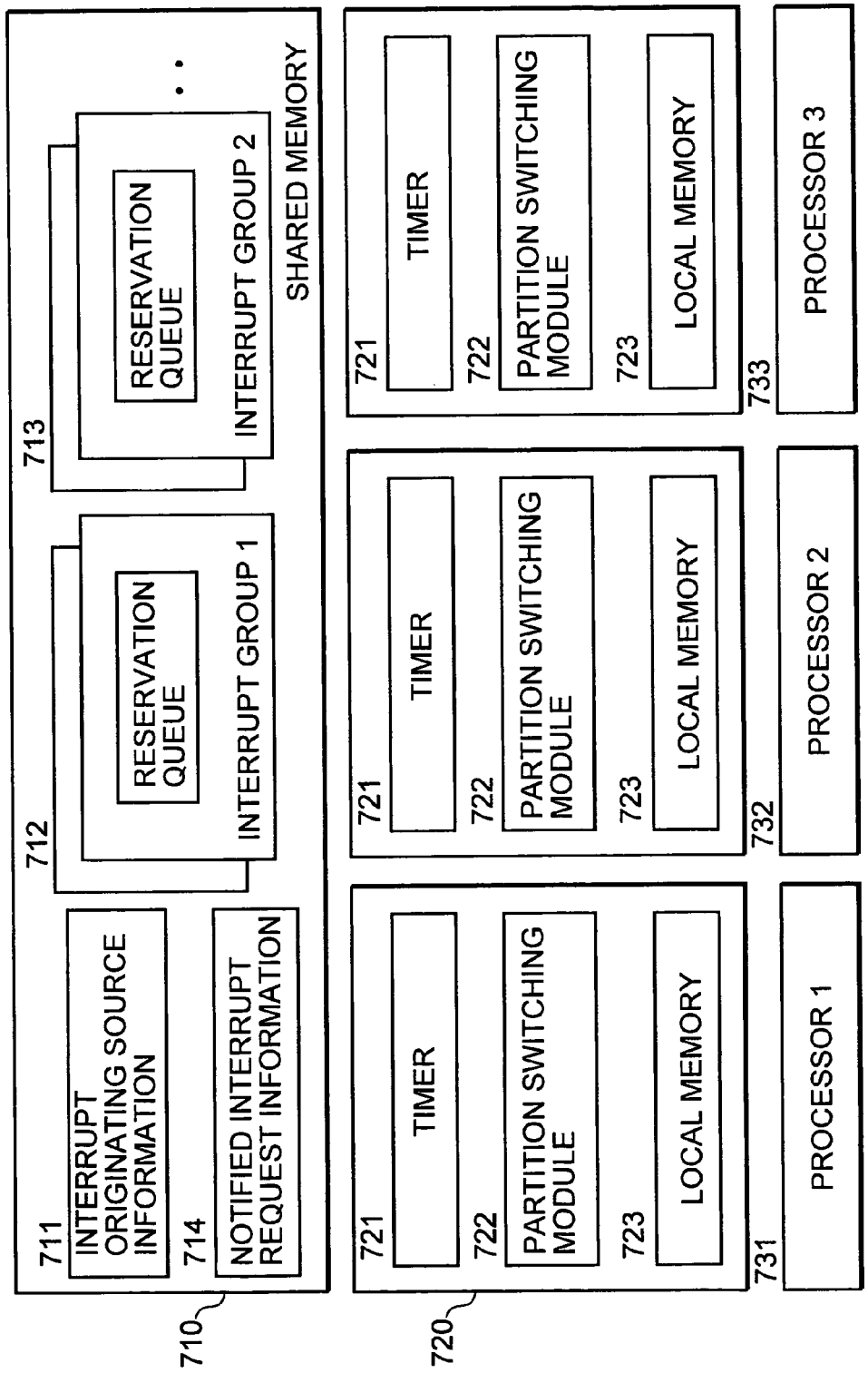
FIG. 9 is a diagram explaining a configuration of process management means of the present invention.

Referring to FIG. 9, an information management configuration of the process management means of the present invention will be described. An example configuration shown in FIG. 9 is an information configuration in a multi-processor system having a plurality of processors, in which each item of information is managed under the control of the level 0-OS (0) shown in FIG. 1, and operation by each of modules is also controlled. A processor-1 731, a processor-2 732, a processor-3 733 can execute processes according to the level 1-OSs (1) in parallel. Note that the level 0-OS (0) also executes its process using any of the processors.

A memory that manages information is divided into a shared memory 710 as a memory area common to the processors, and processor-corresponding modules 720 set so as to correspond to the processors, respectively.

Stored in the shared memory 710 are interrupt request originating source information 711, reservation queues 712, 713 . . . , and notified interrupt request information 714.

Set to each of the processor-corresponding modules 720 is a timer 721, a partition switching module 722, a local memory 723.

Each of the structural elements will be described. The interrupt request originating source information 711 stored in the shared memory 710 is information corresponding to interrupt request originating sources that originate interrupt requests, and includes information shown in FIG. 10.

In an apparatus that executes data processing, interrupt request originating sources that originate interrupt requests would be predetermined elements such as, e.g., a network interface. The interrupt request originating source information 713 is a record of information listed for each interrupt request originating source that originates such an interrupt request.

As shown in FIG. 10, the following information items a-d are set so as to correspond to each interrupt request originating source.

a. Interrupt group number
b. Interrupt processing partition ID
c. Maximum allowable delay time
d. Minimum allowable delay time The item "a. Interrupt group number" is information about a group of interrupt request originating sources for which a processor corresponding to a partition switching module set so as to correspond to each of the processors can perform processes. Group numbers such as shown in, e.g., FIG. 11 are set. In an example shown in FIG. 11, a group 1 is set as a group of interrupt request originating sources a, b, c that originate interrupt requests, and a group 2 is set as a group of interrupt request originating sources d, e, f that originate interrupt requests.

A partition switching module set so as to correspond to each of the processors is to execute only processes related to interrupt request entries stored in a reservation queue corresponding to a group that can be processed by a processor to be identified by the interrupt group information, from a plurality of interrupt group-corresponding reservation queues 712, 713 . . . each being set as an interrupt request queue that is set for each interrupt group.

Returning to FIG. 10, the configuration of the interrupt request originating source information will continuously be described. The item "b. Interrupt processing partition ID" is an ID as the identifier of a partition for executing an interrupt request originated by that interrupt request originating source. The level 0-OS (0) sets the interrupt processing partition ID as partition scheduling data in a case of scheduling an interrupt processing partition in each of the above-mentioned example processes. An interrupt partition is executed according to this setting.

The items "c. Maximum allowable delay time", "d. Minimum allowable delay time" are a maximum allowable delay time and a minimum allowable delay time set so as to correspond to an interrupt request originated by that interrupt request originating source. These information items may not be set in some cases. As described in the above-mentioned process examples, in a case where these information items are set, the level 0-OS (0) sets an interrupt processing partition such that a process can be executed within these allowable times.

As shown in FIG. 9, the shared memory 710 stores reservation queues 712, 713 set for each interrupt group. The interrupt group is, as described above with reference to FIG. 11, information about a group of interrupt request originating sources for which a processor corresponding to a partition switching module set so as to correspond to each of the processors can perform processes.

For example, set as entries in the reservation queue 712 are only interrupt requests originated by the group number 1, i.e., the interrupt request originating sources a, b, c that originate interrupt requests. Set as entries in the reservation queue 713 are only interrupt requests originated by the group number 2, i.e., the interrupt request originating sources d, e, f that originate interrupt requests.

In each of the reservation queues, there are stored, as information about interrupt requests already originated, interrupt request IDs which are the identifiers of the interrupt requests, maximum allowable delay times and minimum allowable delay times corresponding to the interrupt requests, respectively. They are stored in the order of shorter maximum allowable delay times. In a case of scheduling interrupt processing partitions, the level 0-OS (0) sets the interrupt processing partitions or performs a process of setting partitions for executing interrupt processes, by extracting a first one of the reservation queues, i.e., in the order of shorter maximum allowable delay times.

The notified interrupt request information 714 in the shared memory 710 shown in FIG. 9 is an area where to store interrupt request information of which the level 1-OSs, which will actually process the interrupt requests, have already been notified.

That is, the level 1-OSs (1x) are notified sequentially of the interrupt request information stored in the reservation queues 712, 713 under the control of the level 0-OS (0), so as to be assigned to process the interrupt requests. After the notification, the information is stored in the notified interrupt request information 714, and when an interrupt processing partition is completed and the ensuring partition switching takes place, the corresponding one of the notified interrupt request information 71 is cleared. Note that in a case where a partition being executed by a processor at the time of an interrupt request can execute the interrupt request instantly, the level 0-OS (0) notifies an OS (1x) assigned to process the interrupt request without holding the interrupt request in a reservation queue, and then stores the interrupt request information in the notified interrupt request information 714.

Next, a configuration of the processor-corresponding module 720 shown in FIG. 9 will be described. Set in the processor-corresponding module 720 are the timer 721, the partition switching module 722, the local memory 723.

The partition switching module 722 is a module set for each processor, and performs partition switching such that each partition is executed in a time-division manner as a time measured by the corresponding timer 721 passes.

As described in the above-mentioned example processes, the module performs switching to a scheduled partition at a scheduled partition switching time according to a partition schedule set by the level 0-OS (0). For example, the module switches the partition A to the partition B, or to an interrupt processing partition.

The example shown in FIG. 9 involves three processors, and the partition switching modules corresponding to the respective processors are to execute partition switching according to the partition schedules shown in, e.g., FIG. 6(a), (b), (c) described earlier, respectively.

The partition switching module executes the process by referring to information shown in FIG. 13 stored in the corresponding local memory 723.

That is, the module executes partition switching by referring to the following variables, and data structures.

a. Current partition: The ID of a partition currently being executed b. Interrupt group set: A set of interrupt groups that can be processed by a processor that operates a partition switching module c. Partition context: Context of each partition Stored in the partition context are the following values, besides information necessary to resume a suspended process, such as the contents of a register.

c-1. Notified interrupt set: A set of interrupts to be processed by this partition c-2. Predicted start time: A scheduled time at which this partition is started next (this partition is controlled so as not to be started later than the scheduled time)

Furthermore, stored in the local memory 723 are time information for executing a process according to a partition schedule, address information for executing a program. Specifically, Set time information: Time to start a set process Routine address to be started at set time: The address of a routine in which a process to be executed is written Additional information address: An additional information address delivered as an argument when the routine is started These information pieces are stored as listed in the order of set times. Each of the processors acquires an execution program, parameters necessary to execute the program, and the like based on a routine address to be started at a set time and an additional information address, at the set time set as the set time information, i.e., at the time a new partition is executed after partition switching, to start processing the new partition.

[8. Interrupt Process Setting and Execution Sequences]

Figure 14:
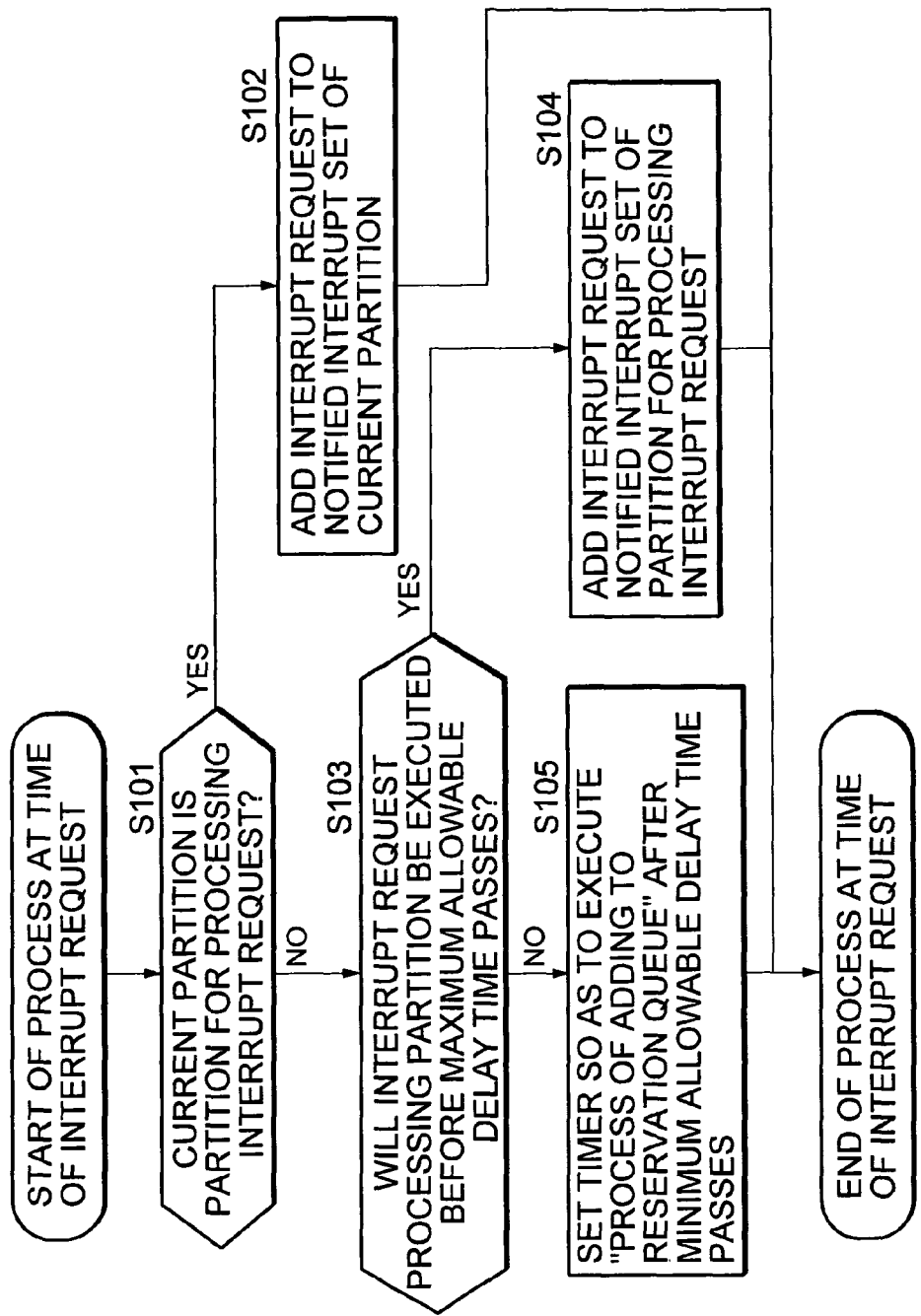
FIG. 14 is a flowchart explaining a process at the time of occurrence of an interrupt request.
Figure 15:
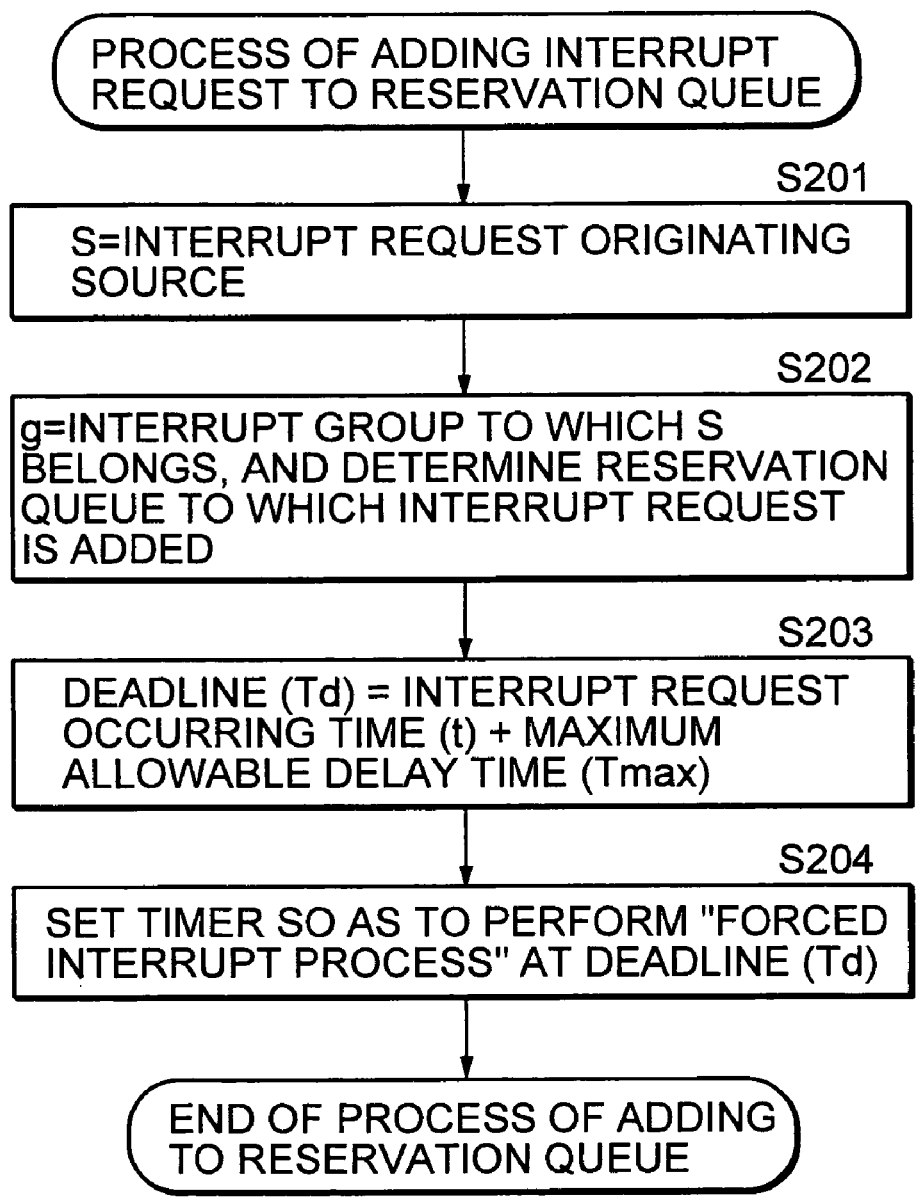
FIG. 15 is a flowchart explaining a process adding an interrupt request to the reservation queue.
Figure 16:
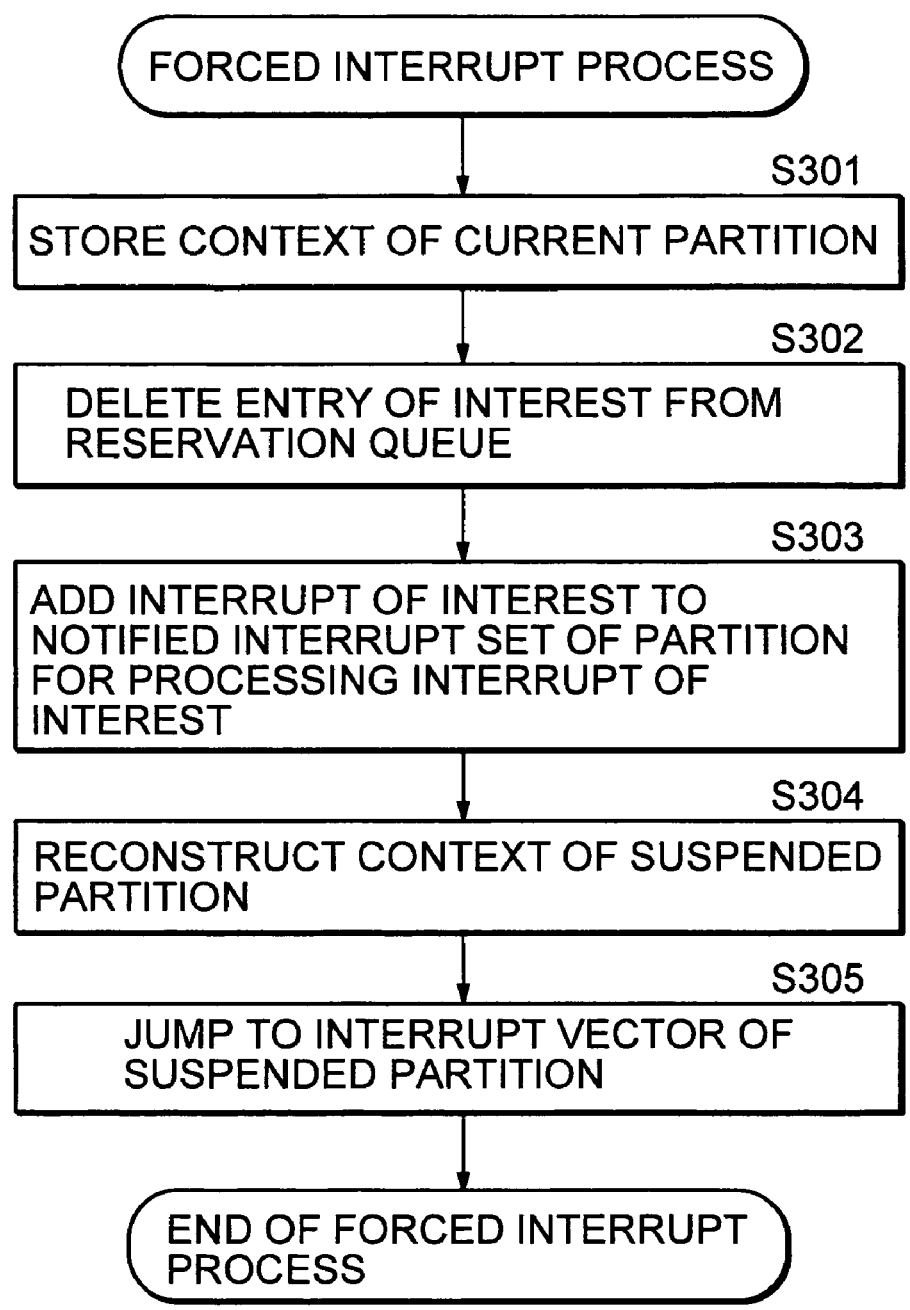
FIG. 16 is a flowchart explaining a forced interrupt process.
Figure 17:
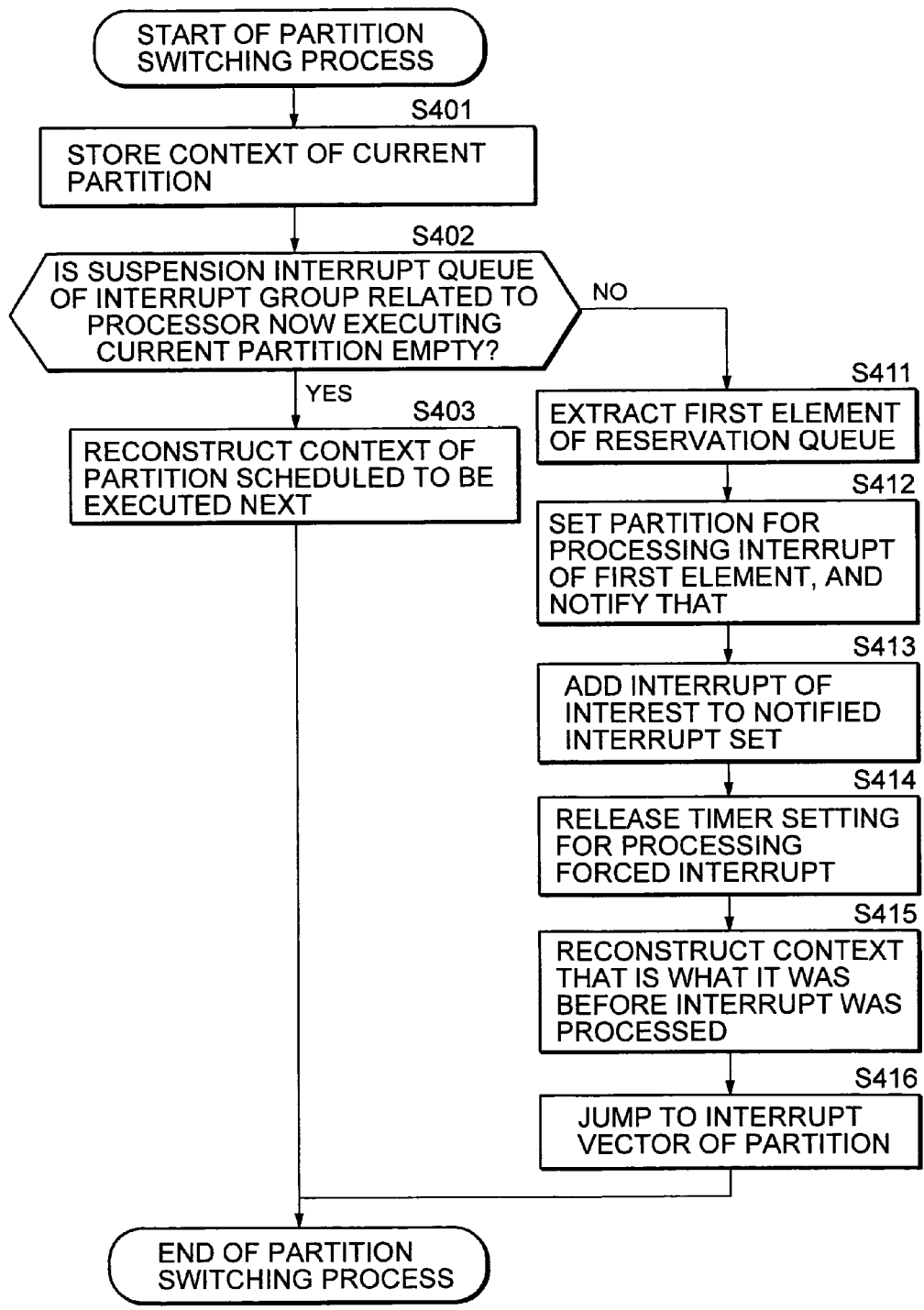
FIG. 17 is a flowchart explaining a partition switching process.

Turning next to flows of FIGS. 14 to 17, the procedures of processes corresponding to interrupt requests to be executed in the process management process of the present invention will be described. The description will be given as divided into the following four processes. Note that these processes are executed by the level 0-OS (0).

a. Process at the time of an interrupt request (FIG. 14)

b. Process of adding an interrupt request to a reservation queue (FIG. 15)

c. Forced interrupt process (FIG. 16)

d. Partition switching process (FIG. 17)

a. Process at the Time of an Interrupt Request

Referring first to a flowchart of FIG. 14, the procedure of a process will be described, which is performed when a certain interrupt request originating source sends an interrupt request to a processor.

When an interrupt request originating source sends an interrupt request to a processor, the level 0-OS (0) determines in step S101 whether or not a current partition being executed by the processor is a partition capable of executing the interrupt request. This is determined by the level 0-OS (0) based on the interrupt request originating source information described earlier with reference to FIG. 10.

In a case where the current partition is a partition capable of executing the interrupt request, the process proceeds to step S102, where the level 0-OS (0) notifies an OS (1x) executing the current partition of a request for processing the interrupt request, and registers it in the notified interrupt request information.

The level 1-OS (1x) thus notified of the request for processing the interrupt request performs an interrupt request process within the current partition, under its own schedule.

If it is determined in step S101 that the current partition being executed by the processor is not a partition capable of executing the interrupt request, the process proceeds to step S103, where it is determined whether or not a partition for executing the interrupt request is scheduled to be executed prior to a maximum allowable delay time set so as to correspond to the interrupt request originating source. This is determined by the level 0-OS (0) based on pre-set partition schedule information.

In a case where the partition for executing the interrupt request is scheduled to be executed prior to the maximum allowable delay time set so as to correspond to the interrupt request originating source, the process proceeds to step S104 to notify the OS (1x) for executing the partition scheduled to be executed prior to the maximum allowable delay time, of the request for processing the interrupt request, and to register it in the notified interrupt request information.

The level 1-OS (1x) thus notified of the request for processing the interrupt request performs an interrupt request process within the partition scheduled to be executed, under its own schedule.

On the other hand, in a case where it is determined in step S103 that the partition for executing the interrupt request is not scheduled to be executed prior to the maximum allowable delay time set so as to correspond to the interrupt request originating source, the process proceeds to step S105, to set a timer such that a "reservation queue addition process" will be executed after a minimum allowable delay time set so as to correspond to the interrupt request originating source passes.

The minimum allowable delay time is, as described earlier with reference to FIG. 10, information included in the interrupt request originating source information. The level 0-OS (0) sets the timer on the basis of the minimum allowable delay time, and executes the "reservation queue addition process" after the minimum allowable delay time passes. This reservation queue addition process will be described with reference to FIG. 15 later.

Note that a reservation queue to be added is, as mentioned earlier, set for each interrupt group, and thus interrupt request information is added to a reservation queue corresponding to an interrupt group on the basis of an interrupt group number included in the interrupt request originating source information. The information set in the queue is, as described earlier with reference to FIG. 12, the interrupt request ID, the maximum allowable delay time, the minimum allowable delay time.

After the information is added to the reservation queue, the level 0-OS (0) sequentially acquires interrupt requests from the queue in the order of first ones, and executes a partition setting process in which their maximum allowable delay time and minimum allowable delay time are taken into account, in accordance with the aforementioned example processes.

b. Process of Adding an Interrupt Request to a Reservation Queue (FIG. 15)

A process of adding an interrupt request to a reservation queue will be described next with reference to the flow of FIG. 15.

In step S201, an interrupt request originating source S is specified, and in step S202, an interrupt group g is specified by referring to the interrupt request originating source information on the basis of the interrupt request originating source S, to determine the group to which an interrupt request is to be added belongs.

Furthermore, in step S203, a maximum allowable delay time (Tmax) corresponding to the interrupt request is added to the interrupt request occurring time (t), to calculate maximum delay execution time information Td (deadline) for the interrupt request, and in step S204, the timer is set to the maximum delay execution time information Td (deadline). This timer setting information is used to execute a forced interrupt in a case where an interrupt partition, such as partition switching, cannot be set within this period of time.

In a case where an interrupt partition such as partition switching can be set prior to the time limit set by the timer, the timer is reset. In a case where an interrupt partition such as partition switching cannot be set prior to the time limit set by the timer, a partition being executed is suspended to execute the interrupt process, i.e., to perform a forced interrupt process, as the time limit set by the timer expires.

c. Forced Interrupt Process

Referring next to FIG. 16, a procedure for executing a forced interrupt process will be described. This forced interrupt process is, as described earlier with reference to FIG. 5, a process performed in a case where partition switching is not performed within a maximum allowable delay time set so as to correspond to an interrupt request (interrupt request originating source).

In step S301, the level 0-OS (0) stores in a memory a context corresponding to a partition being executed by a level 1-OS (1x) which is caused to execute the interrupt process, while suspending a current partition. The context includes information necessary to resume the process after the suspension, such as, e.g., register values.

In step S302, an entry in a reservation queue corresponding to the interrupt process to be executed by the forced interrupt is deleted, and in step S303, the interrupt request information is added to the notified interrupt request information. Note that in performing this process, the level 0-OS (0) notifies an OS (1x) for executing the interrupt partition by means of forced interrupt to execute the interrupt request. The level 1-OS (1x) notified of a request for processing the interrupt request performs the interrupt request process.

Furthermore, in step S304, the level 0-OS (0) reconstructs the context of the suspended partition, and in step S305, jumps to an interrupt vector of the suspended partition. This processing of steps S304, S305 is to cause the level 1-OS (1x) to resume the partition suspended by the interrupt request process, and is to be performed so as to restore the partition to what it was before the suspension, in step S304, and to cause the partition to return to what its process step was before the suspension, in step S305.

d. Partition Switching Process

Next, a partition switching process will be described with reference to a flowchart of FIG. 17.

Partition switching is executed at a timing according to a partition schedule set by the level 0-OS (0). Or, it is also a process executed in the case of the above-mentioned forced interrupt.

In step S401, the level 0-OS (0) stores in a memory the context of a current partition which will be closed in order to execute partition switching. The context includes information necessary to resume the partition, such as, e.g., register values.

In step S402, queue storing conditions as to the reservation queue of an interrupt group related to a processor now executing the current partition is determined.

In a case where the queue is empty, an interrupt process is not to be executed, but a process according to a pre-set partition schedule will be executed. Thus, the process proceeds to step S403, where the context of a partition scheduled to be executed next is reconstructed, and, on the basis of the reconstructed context, the next partition is executed by the level 1-OS (1x).

In a case where it is determined in step S402 that there is an interrupt request queue in the reservation queues of the interrupt group related to the processor now executing the current partition, the process proceeds to step S411, where interrupt request entries are acquired from the reservation queue in the order of first ones. As mentioned earlier, each reservation queue has interrupt requests arranged in the order of their shorter maximum allowable delay times.

In step S412, an OS (1x) for executing an interrupt partition corresponding to the acquired interrupt request from the reservation queue is notified to execute the interrupt request. The level 1-OS (1x) notified of a request for processing the interrupt request performs an interrupt request process. In step S413, the interrupt information is added to the notified interrupt request information.

In step S414, a timer setting for processing a forced interrupt set so as to correspond to a maximum allowable delay time of the notified interrupt request is released.

Furthermore, in step S415, the status values are restored to what they were before the interrupt process was executed, i.e., the context of the partition is reconstructed, and in step S416, a process of jumping to an interrupt vector of the partition is executed. The processing of steps S415, S416 is to cause the level 1-OS (1x) to normally execute a partition scheduled to be executed subsequent to the partition delayed by the interrupt request process, and thus, the processing of step S415 is performed as a process of restoring various status values that have changed due to occurrence of the interrupt to what they were in a case where the interrupt did not occur, and the processing of step S416 is executed as a process of setting the level 1-OS (1x) to a process step where the interrupt did not occur.

[9. Example Hardware Configuration of Information Processing Apparatus]

Next, an example hardware configuration of an information processing apparatus will be described, which has the process management means that executes the above-mentioned processes. The above-mentioned process management is implementable by ordinary PCs, and is thus implemented in various information processing apparatuses including PCs, by storing an OS having a hierarchical configuration shown in FIG. 1, i.e., a plurality of level 1-OS (1x) programs that actually execute processing in cooperation with applications, and by storing a level 0-OS (0) program that executes partition management over these plurality of level 1-OS (1x) programs.

FIG. 18 shows a configuration example of an information processing apparatus capable of executing the above-mentioned process management.

CPUs (Central Processing Units) 951, 952, 953 execute various processes according to programs stored in a ROM (Read Only Memory) 902, a HDD 904, or the like, and thus function as data processing means.

They execute various processes under the control of the level 1-OSs (1x) in the above-mentioned embodiments. Furthermore, they are also applied to the processes executed by the level 0-OS (0). The processors (CPUs) are provided with timers 961, 962, 963, respectively, which are used for partition scheduling management, measurement of the maximum delay time and the minimum delay time of interrupt requests.

A RAM 903 stores programs executed and data processed by each of the CPUs 961, 962, 963, as appropriate. The programs include a partition management program executed by the level 0-OS (0), and the above-mentioned various processes are to be executed on the basis of the partition management program.

Further, stored therein are interrupt group-corresponding reservation queues, interrupt request originating source information, notified interrupt request information within the shared memory, and further information stored in the local memories corresponding to the respective processors, such as, e.g., context information to be stored, reconstructed at the time of partition switching, various time information, address information. While the local memories and the shared memory are described as individual entities in FIG. 9, these may be stored by dividing a single memory into the corresponding storage areas. The CPUs 951, 952, 953, the ROM 902, and the RAM 903, the HDD 904 are interconnected via a bus 905.

Connected to the bus 905 is an input/output interface 906, and connected to the input/output interface 906 are, e.g., an input section 907 that processes input information from a keyboard, a mouse, and the like manipulated by a user, an output section 908 constructed of an LCD, a CRT, speakers, and the like that present various information to the user. Furthermore, connected thereto are a communication section 909 that functions as a data exchanging means, a drive 910 that has a removable recording medium 911 such as a magnetic disk, an optical disc, a magneto-optical disc, or a semiconductor memory attached thereto, and that executes data reading or writing from or to the removable recording medium 911.

The hardware configuration shown in FIG. 18 is a hardware configuration example of a PC, which is one of information processing apparatuses to which the above-mentioned process management is applicable. The process management of the present invention is applicable not only to this PC configuration, but also to various information processing apparatuses including game machines, communication terminal apparatuses, in which a plurality of OSs are installed and process management by partition management is executed.

The present invention has been described above in great detail with reference to the specific embodiments. However, it is self-explanatory that those skilled in the art can make modifications to and substitutions for the embodiments without departing from the scope and spirit of the present invention. That is, the present invention has been disclosed by way of examples, and thus should not be construed in a restrictive sense. In order to judge the scope and spirit of the present invention, the appended claims should be taken into consideration.

Note that the series of processes described in the specification can be performed by hardware, software, or a configuration in which both are combined. In a case where a process based on software is executed, the processes could be executed by installing a program having recorded processing sequences therein in a memory within a computer incorporated into dedicated hardware, or by installing the program in a general-purpose computer that can execute various processing.

For example, the program can be recorded on a hard disk or a ROM (Read Only memory) as a recording medium beforehand. Alternatively, the program can be stored (recorded) temporarily or permanently on a removable recording medium, such as a flexible disk, a CD-ROM (Compact Disc Read Only Memory), a MO (Magneto optical) disk, a DVD (Digital Versatile Disc), a magnetic disk, a semiconductor memory. Such a removable recording medium can be provided as so-called package software.

Note that the program can be installed in the computer not only from a removable recording medium such as those mentioned above, but also through wireless transmission to the computer from a downloading site, wired transmission to the computer via a network such as a LAN, the Internet to allow the computer to receive the thus transmitted program for installation in a storage medium such as a hard disk incorporated therein.

Note that the various processes described in the specification are executed not only time-sequentially according to the description, but may also be executed parallely or individually, as necessary, according to the processing capacity of apparatuses assigned to execute the processes. In addition, the system in the present description means a logical mass structure of a plurality of apparatuses, and is not limited to those having apparatuses of respective structure in a single housing.

INDUSTRIAL APPLICABILITY

As described above, according to the configuration of the present invention, in a process control for switching processes which are based on a plurality of operating systems (OSs), it is configured to set an interrupt processing partition as an interrupt processing execution period corresponding to an interrupt processing request so as to coincide with a pre-set partition switching timing. Therefore, an increment in the number of partition switching processes corresponding to the interrupt request can be kept to 1, whereby processing load is prevented from increasing, and efficient data processing can be executed.

Furthermore, according to the configuration of the present invention, in a case where a maximum allowable delay time or a minimum allowable delay time is set to an interrupt processing request, it is configured to set an interrupt processing partition at a partition switching timing if the partition switching timing occurs within these allowable times, and to perform a forced interrupt process, e.g., in a case where the partition switching timing does not occur within these allowable times, whereby to execute processing accommodating various interrupt processing requests. Therefore, a configuration free from processing error is implemented.

Furthermore, according to the configuration of the present invention, in a configuration in which processes by a plurality of OSs are executable in parallel in a multi-processor system, it is configured to select one of a plurality of partition schedules corresponding to a plurality of processors, and set an interrupt processing partition so as to coincide with a partition switching timing in the selected partition schedule. Therefore, the interrupt request can be executed at the earliest partition switching timing after the occurrence of the interrupt processing request, from among the plurality of partition schedules, and thus more efficient data processing becomes possible.

The invention claimed is:

1. An information processing apparatus, comprising:
    a storage section storing a plurality of operating systems (OSs);
    a first processor that executes processes of the OSs; and
    a process manager that:
        schedules execution of partitions of the OSs along a time axis, wherein a first OS of the OSs is executing in a current partition,
        controls the timing of switching between execution of the partitions in accordance with the schedule, the schedule including a schedualed switch to a second OS of the OSs,
        receives an interrupt request having a maximum time that execution of an interrupt associated with the interrupt request can be delayed from receipt of the interrupt request, the interrupt request requiring the second OS of the OSs,
        determines whether the time to the scheduled switch to the second OS is less than the maximum allowable delay time from receipt of the interrupt request,
        when it is determined that the time to the scheduled switch to the second OS is less than the maximum allowable delay time from receipt of the interrupt request, causes the second OS to execute the interrupt request at the time of the scheduled switch to the second OS, and
        when it is determined that the time to the scheduled switch to the second OS is longer than the maximum allowable delay time from receipt of the interrupt request, causes the second OS to execute the interrupt request by interrupting execution of the current partition.

2. The information processing apparatus according to claim 1, wherein the process manager is further configured to suspended execution of the partitions to execute the interrupt process, when it is determined that the time to the earliest scheduled switch is longer than the maximum allowable delay time from the occurrence of the interrupt request.

3. The information processing apparatus according to claim 1, further comprising:
    a second processor that executes the processes of the OSs in parallel with the first processor,
    wherein the process manager is further configured to:
        schedule execution of the partitions along the time axis as to the first and second processors such that the first and second processors switch between execution of the partitions in accordance with the schedule,
        select a schedule corresponding to the first processor or to the second processor, and
        interrupt execution of the partitions by the first processor or the second processor at the time of a scheduled switch between execution of the partitions contained in the selected schedule.

4. The information processing apparatus according to claim 3, wherein the process manager is configured to:
    select a schedule having the earliest scheduled switch between execution of the partitions after receiving the interrupt request, and
    interrupt execution of the partitions at the time of the earliest scheduled switch.

5. The information processing apparatus according to claim 1, wherein the process manager is further configured to:
    receive a second interrupt request having a minimum allowable execution delay time, and
    execution of the partitions at the time of a scheduled switch between execution of the partitions that occurs after the minimum allowable delay time from receipt of the second interrupt request has elapsed.

6. The information processing apparatus according to claim 1, wherein the process manager is further configured to:
    receive a second interrupt request that is executable during execution of a specific partition,
    determine, based on the schedule, when the specific partition will be executed, and
    when the specific partition is being executed, interrupt execution of the specific partition to execute the second interrupt request.

7. The information processing apparatus according to claim 1, further comprising:
    a second processor that executes the processes of the OSs in parallel with the first processor, and
    first and second partition switching modules for respectively controlling the processors to switch between execution of the partitions,
    wherein the process manager is further configured to the first and second partition switching modules to cause the processors to execute the partitions in accordance with the schedule.

8. The information processing apparatus according to claim 7, further comprising:
    a memory storing reservation queues of entries containing information about received interrupt requests, the queues being grouped based on sources from which the interrupt requests originated
    wherein the first and second partition switching modules are configured to select, from the reservation queues and based on the grouping, entries corresponding to interrupt requests originating from sources which can be accommodated by the processors, respectively.

9. A method performed by a computer for controlling switching between execution of partitions of a plurality of operating systems (OSs), comprising:
    receiving, by one or more processors, an interrupt processing request when a first OS of the OSs is executing in a current partition,
    determining, by the one or more processors, whether the interrupt processing request has a maximum time that execution of an interrupt associated with the interrupt request can be delayed from receipt of the interrupt request and requires a second OS of the OSs to execute the interrupt,
    receiving, by the one or more processors, a schedule of execution of the partitions including a scheduled switch to the second OS,
    determining, by the processor, whether the time to the scheduled switch to the second OS is less than the maximum allowable delay time from receipt of the interrupt request,
    when it is determined that when the time to the scheduled switch is less than the maximum allowable delay time, scheduling, by the one or more processors, execution of the interrupt processing request for the scheduled switch to the second OS, and
    when it is determined that the time to the scheduled switch to the second OS is longer than the maximum allowable delay time from receipt of the interrupt request, interrupting, by the one or more processors, causing the second OS to execute the interrupt request by interrupting execution of the current partition.

10. The method according to claim 9, further comprising:
when it is determined that the time to the earliest scheduled switch is longer than the maximum allowable delay time from receipt of the interrupt processing request, suspending, by the processor, execution of the partitions to execute the a partition interrupt processing request.

11. The method according to claim 9, further comprising:
scheduling, by the processor, execution of the partitions along a time axis as to a plurality of processors that execute the partitions of the OSs, such that the processors switch between execution of the partitions in accordance with the schedule,
selecting, by the processor, a schedule corresponding to one of the processors, and
interrupting, by the processor, execution of the partitions by the processor corresponding to the selected schedule to execute the interrupt processing request.

12. The method according to claim 11, wherein interrupting execution includes selecting, by the processor, a schedule having an earliest scheduled switch between execution of the partitions after receipt of the interrupt request, and executing, by the processor, the interrupt processing request at the time of the earliest scheduled switch.

13. The method according to claim 9, further comprising:
receiving, by the processor, a second processing interrupt request having a minimum allowable execution delay time,
scheduling, by the processor, execution of the second interrupt processing request at the time of a scheduled switch between execution of the partitions that occurs after the minimum allowable delay time has elapsed.

14. The method according to claim 9, further comprising:
receiving, by the processor, a second interrupt processing request that is executable during execution of a specific partition,
determining, by the processor and based on the schedule, when the specific partition will be executed, and
when the specific partition is being executed, interrupting, by the processor, execution of the specific partition to execute the second interrupt processing request.

15. A computer-readable storage medium storing a computer program which, when executed by an information processing apparatus, causes the information processing apparatus to perform a method for controlling switching between execution of partitions of a plurality of operating systems (OSs), the method comprising:
receiving, by one or more processors, an interrupt processing request when a first OS of the OSs is executing in a current partition,
determining, by the one or more processors, whether the interrupt processing request has a maximum time that execution of an interrupt associated with the interrupt request can be delayed from receipt of the interrupt request and requires a second OS of the OSs to execute the interrupt,
receiving, by the one or more processors, a schedule of execution of the partitions including a scheduled switch to the second OS,
determining, by the processor, whether the time to the scheduled switch to the second OS is less than the maximum allowable delay time from receipt of the interrupt request,
when it is determined that when the time to the scheduled switch is less than the maximum allowable delay time, scheduling, by the one or more processors, execution of the interrupt processing request for the scheduled switch to the second OS, and
when it is determined that the time to the scheduled switch to the second OS is longer than the maximum allowable delay time from receipt of the interrupt request, causing, by the one or more processors, the second OS to execute the interrupt request by interrupting execution of the current partition.

* * * * *